(12) United States Patent
Park

(10) Patent No.: US 11,394,934 B2
(45) Date of Patent: Jul. 19, 2022

(54) BINNED ANTI-COLOR PIXEL VALUE GENERATION

(71) Applicant: QUALCOMM Incorporated, San Diego, CA (US)

(72) Inventor: Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/030,724

(22) Filed: Sep. 24, 2020

(65) Prior Publication Data

US 2022/0094887 A1    Mar. 24, 2022

(51) Int. Cl.
*H04N 9/04*  (2006.01)
*H04N 5/347*  (2011.01)

(52) U.S. Cl.
CPC ......... *H04N 9/04555* (2018.08); *H04N 5/347* (2013.01); *H04N 9/0451* (2018.08); *H04N 9/04551* (2018.08); *H04N 9/04559* (2018.08)

(58) Field of Classification Search
CPC ........... H04N 9/04555; H04N 9/04551; H04N 9/0451; H04N 9/04559; H04N 5/347
See application file for complete search history.

(56) References Cited

U.S. PATENT DOCUMENTS

| | | | |
|---|---|---|---|
| 5,751,385 A * | 5/1998 | Heinze ................ | G02F 1/13473 349/61 |
| 9,467,666 B1 | 10/2016 | Topliss et al. | |
| 10,136,077 B1 | 11/2018 | Twede et al. | |
| 11,062,161 B1 | 7/2021 | Park | |
| 2002/0024653 A1 | 2/2002 | Jung et al. | |
| 2004/0178478 A1 | 9/2004 | Shizukuishi | |
| 2005/0103977 A1 * | 5/2005 | Krymski ............... | H04N 3/1562 250/208.1 |
| 2005/0236653 A1 * | 10/2005 | Lim ....................... | G02B 5/201 257/294 |
| 2008/0266564 A1 * | 10/2008 | Themelis ................. | G01J 3/51 356/419 |

(Continued)

FOREIGN PATENT DOCUMENTS

EP          1558023 A2    7/2005
WO    WO 2019125759 A1    6/2019

OTHER PUBLICATIONS

International Search Report and Written Opinion—PCT/US2021/043755—ISA/EPO—dated Oct. 22, 2021.

*Primary Examiner* — Chiawei Chen
(74) *Attorney, Agent, or Firm* — Qualcomm Incorporated

(57) ABSTRACT

Methods, apparatuses, systems, and non-transitory computer-readable media are disclosed for generating pixel values. Such a method may involve filtering light using a plurality of anti-color filters arranged among an array of filters, each of the plurality of anti-color filters corresponding to a rejection band, to generate a plurality of portions of anti-color filtered light. The method may further involve receiving the plurality of portions of anti-color filtered light at a plurality of optical pixel sensors. The method may further involve generating, at the plurality of optical pixel sensors, a plurality of pixel signals based on the plurality of portions of anti-color filtered light. The method may further involve generating a binned anti-color pixel value by combining the plurality of pixel signals.

31 Claims, 16 Drawing Sheets

(56) References Cited

U.S. PATENT DOCUMENTS

| | | | |
|---|---|---|---|
| 2009/0200451 A1 | 8/2009 | Conners | |
| 2010/0328485 A1* | 12/2010 | Imamura | H04N 5/347 348/222.1 |
| 2010/0328505 A1* | 12/2010 | Imamura | H04N 9/04557 348/273 |
| 2011/0063473 A1* | 3/2011 | Tsunekawa | H04N 5/347 348/222.1 |
| 2011/0228097 A1* | 9/2011 | Motta | H04N 5/33 348/164 |
| 2013/0041221 A1* | 2/2013 | McDowall | H04N 9/04557 600/111 |
| 2015/0350575 A1* | 12/2015 | Agranov | H04N 5/347 348/302 |
| 2021/0014443 A1* | 1/2021 | Ollesson | H04N 5/347 |
| 2021/0026355 A1* | 1/2021 | Chen | G06K 9/00791 |

\* cited by examiner

Anti-red notch filter

Anti-green notch filter

Anti-blue notch filter

Anti-red notch filter

Anti-green notch filter

Anti-blue notch filter

BINNED ANTI-COLOR PIXEL VALUE GENERATION

BACKGROUND

Image-based detection has wide applicability in practical applications. For example, optical machine learning (ML) detection may be implemented in a range of devices, including low-cost consumer electronics devices. However, in many scenarios, significant limitations on power, available light, and/or processing resources can degrade performance. In particular, monochromatic detection versus chromatic detection can involve difficult tradeoffs. In some cases, such as scenarios involving reduced sensor area, limited exposure time, and/or low lighting conditions, color pixels may be associated with poor signal strength, which can negatively impact detection performance. Monochromatic sensors may improve signal strength by capturing more light. However, monochromatic sensor outputs limit the types of detection that can be achieved. For example, the detector may not be able to distinguish objects based on color. There is a significant need for improved techniques in image capture and processing to improve signal strength and retain color-related information.

BRIEF SUMMARY

Methods, apparatuses, devices, systems, and non-transitory computer-readable media are disclosed for generating pixel values. A method for generating pixel values may involve filtering light using a plurality of anti-color filters arranged among an array of filters, each of the plurality of anti-color filters corresponding to a rejection band, to generate a plurality of portions of anti-color filtered light. The method may further involve receiving the plurality of portions of anti-color filtered light at a plurality of optical pixel sensors. The method may further involve generating, at the plurality of optical pixel sensors, a plurality of pixel signals based on the plurality of portions of anti-color filtered light. The method may further involve generating a binned anti-color pixel value by combining the plurality of pixel signals.

The plurality of anti-color filters may comprise adjacent or non-adjacent anti-color filters in the array of filters. The plurality of anti-color filters may comprise anti-color filters corresponding to similar or different rejection bands. In one embodiment, anti-color filters corresponding to different rejection bands are adjacent anti-color filters in the array of filters. In another embodiment, anti-color filters corresponding to different rejection bands are non-adjacent anti-color filters in the array of filters.

In one embodiment, generating the binned anti-color pixel value comprises a first level and a second level of binning. At the first level of binning, the method may involve (1) generating a first binned anti-color pixel value by combining a first plurality of pixel signals based on a first plurality of portions of anti-color filtered light and (2) generating a second binned anti-color pixel value by combining a second plurality of pixel signals based on a second plurality of portions of anti-color filtered light. At the second level of binning, the method may involve generating a second-level binned anti-color pixel value by combining the first binned anti-color pixel value and the second binned anti-color pixel value. The first plurality of portions of anti-color filtered light may be generated using first adjacent anti-color filters corresponding to a first rejection band, and the second plurality of portions of anti-color filtered light may be generated using second adjacent anti-color filters corresponding to a second rejection band different from the first rejection band.

In one embodiment, the plurality of anti-color filters comprises anti-color filters corresponding to different rejection bands, and the binned anti-color pixel value is used for detecting a class of objects. Furthermore, one or more of the plurality of pixel signals based on the plurality of portions of anti-color filtered light may be used for detecting a sub-class of objects within the class of objects. Detecting the class of objects may be based on pixel brightness. Detecting the sub-class of objects may be based on anti-color pixel information.

In one embodiment, the array of filters comprises a repeat pattern of anti-color filters, and the plurality of anti-color filters is selected from the array of filters using a skip pattern different from the repeat pattern. For example, the repeat pattern may comprise a two-by-two repeat pattern, and the skip pattern may correspond to skip-by-three skip pattern.

In one embodiment, combining the plurality of pixel signals is performed using analog circuitry within an optical pixel sensor unit, the optical pixel sensor unit including the plurality of optical pixel sensors. In another embodiment, combining the plurality of pixel signals is performed using digital circuitry outside an optical pixel sensor unit, the optical pixel sensor unit including the plurality of optical pixel sensors. For example, the digital circuitry may comprise a processor. In yet another embodiment, combining the plurality of pixel signals is performed using a combination of analog circuitry and/or digital circuitry located inside and/or outside an optical pixel sensor, the optical sensor unit including the plurality of optical pixel sensors.

An apparatus for generating pixel values may comprise a plurality of anti-color filters arranged among an array of filters, each of the plurality of anti-color filters corresponding to a rejection band, the plurality of anti-color filters configured to filter light and generate a plurality of portions of anti-color filtered light. The apparatus may further comprise a plurality of optical pixel sensors configured to receive the plurality of portions of anti-color filtered light and generate a plurality of pixel signals based on the plurality of portions of anti-color filtered light. The apparatus may further comprise circuitry configured to generate a binned anti-color pixel value by combining the plurality of pixel signals.

A system for generating pixel values may comprise means for filtering light using a plurality of anti-color filters arranged among an array of filters, to generate a plurality of portions of anti-color filtered light, each of the plurality of anti-color filters corresponding to a rejection band, means for receiving the plurality of portions of anti-color filtered light at a plurality of optical pixel sensors, means for generating, at the plurality of optical pixel sensors, a plurality of pixel signals based on the plurality of portions of anti-color filtered light received at the plurality of optical sensors, and means for generating a binned anti-color pixel value by combining the plurality of pixel signals.

A non-transitory computer-readable medium having instructions stored thereon for generating pixel values may include instructions for causing one or more processors to control generating, at a plurality of optical pixel sensors, a plurality of pixel signals based on a plurality of portions of anti-color filtered light filtered using a plurality of anti-color filters arranged among an array of filters, each of the plurality of anti-color filters corresponding to a rejection band. The instructions may further cause the one or more processors to control generating, at a combining unit, a binned anti-color pixel value by combining on the plurality of pixel signals.

A device for generating pixel values may comprise a memory and a processor communicatively coupled to the memory. The processor may be configured to control generating, at a plurality of optical pixel sensors, a plurality of pixel signals based on a plurality of portions of anti-color filtered light filtered using a plurality of anti-color filters arranged among an array of filters, each of the plurality of anti-color filters corresponding to a rejection band. The processor may further be configured to control generating, at a combining unit, a binned anti-color pixel value by combining on the plurality of pixel signals.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1A:
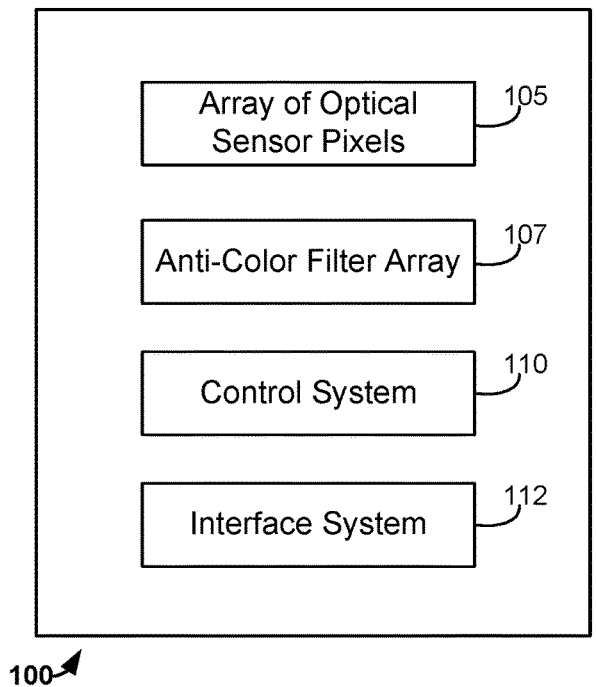
FIG. 1A is a block diagram that shows example components of an apparatus according to some implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes an apparatus or system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, handheld or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the FIG.s, but instead have wide applicability as will be readily apparent to one having ordinary skill in the art.

Various implementations disclosed herein may include an apparatus that has an anti-color filter array proximate an array of optical sensor pixels. The anti-color filter array may include first anti-color filters. Each of the first anti-color filters may be located near a corresponding instance (or group of instances) of a first plurality of optical sensor pixels. Each of the first anti-color filters may be configured to at least partially suppress transmission of light in a first optical wavelength range. According to some examples, the first anti-color filters may be notch filters. In some examples, the first optical wavelength range may correspond to a first color. The anti-color filter array may, in some instances, include second anti-color filter regions. Each of the second anti-color filter regions may be located near a corresponding instance of a second plurality of optical sensor pixels. In some examples, each of the second anti-color filter regions is not configured to suppress transmission of light in the first optical wavelength range. In some such examples, each of the second anti-color filter regions may be configured to at least partially suppress transmission of light in a second optical wavelength range. The anti-color filter array may, in some examples, include additional anti-color filter regions.

A control system may be configured for receiving optical sensor pixel values from the array of optical sensor pixels, for analyzing the optical sensor pixel values to detect at least a first object and for determining first object color information. Determining the first object color information may involve obtaining at least one first optical sensor value from at least one instance of the first plurality of optical sensor pixels and obtaining at least one second optical sensor value from at least one instance of the second plurality of optical sensor pixels corresponding to the first object, and comparing the first optical sensor value(s) and the second optical sensor value(s). In some examples, the control system may be part of the apparatus that includes the anti-color filter array and the array of optical sensor pixels, whereas in other examples the control system may reside in another device that is configured for communication with the apparatus.

Particular implementations of the subject matter described in this disclosure can be implemented to realize one or more of the following potential advantages. In some instances, it may be beneficial both to determine an object type (e.g., an apple) and to determine object color information (e.g., whether the apple is red or green, more red than green, more green than red, etc.). Prior color-determination methods were generally based upon input from optical sensor pixels having associated color filters, such as Bayer color filters. Each of the color filters would pass a wavelength range (e.g., a wavelength range corresponding to red, green or blue light) and suppress other wavelength ranges. Therefore, such color filters would typically block much more of the light that otherwise could have been received by the optical sensor pixels. Some disclosed anti-filter methods and devices can provide relatively greater light sensitivity and therefore improved performance, particularly when the ambient light intensity is relatively low. The improved performance may include a relatively lower exposure time and/or a relatively lower gain when the ambient light intensity is low.

The disclosed anti-filter methods and devices may be particularly beneficial when implemented by, or in conjunction with, a low-power optical sensor and/or an optical sensor having a relatively low bit width. The associated processes of determining object color information can be performed without the computational overhead that is required, for example, to produce realistic color images, eliminate artifacts that may potentially be caused by a color filter, etc. For many use cases, it may be unnecessary to determine detailed object color information: merely knowing whether, e.g., an apple is more red than green, whether a car is red or blue, etc., may be sufficient.

FIG. 1A is a block diagram that shows example components of an apparatus according to some implementations. In this example, the apparatus 100 includes an array of optical sensor pixels 105, an anti-color filter array 107 proximate the array of optical sensor pixels 105 and a control system 110 that is configured to communicate with the array of optical sensor pixels 105. In this example, the apparatus 100 includes an interface system 112.

In some examples, the anti-color filter array 107 may include a first plurality of first anti-color filters. As used herein, the term "anti-color filter" refers generally to a filter that is configured to at least partially suppress transmission of light in an optical wavelength range. In some instances, the optical wavelength range may correspond to, or be within the range of, a color of the visible spectrum, such as violet (380-450 nm), blue (450-485 nm), cyan (485-500 nm), green (500-565 nm), yellow (565-590 nm), orange (590-625 nm) or red (625-740 nm). In some implementations, the optical wavelength range may correspond to a wavelength range that is shorter or longer than the wavelength range of the visible spectrum, such as an infrared or ultraviolet wavelength range.

According to some such examples, each of the first anti-color filters may be proximate a corresponding instance (or group of instances) of a first plurality of optical sensor pixels. In some such examples, each of the first anti-color filters may be configured to at least partially suppress transmission of light in a first optical wavelength range. Various examples are provided herein.

In some implementations, the anti-color filter array 107 may include a second plurality of second anti-color filter regions. In some such implementations, the second plurality of second anti-color filter regions may include a second plurality of second anti-color filters. Each of the second anti-color filters may be proximate a corresponding instance (or group of instances) of a second plurality of optical sensor pixels. In some such implementations, each of the second anti-color filters may be configured to at least partially suppress transmission of light in a second optical wavelength range. Alternatively, or additionally, in some implementations the second plurality of second anti-color filter regions may include one or more substantially transparent regions.

In some implementations, the anti-color filter array 107 may include a third plurality of third anti-color filter regions. In some such implementations, the third plurality of third anti-color filter regions may include a third plurality of third anti-color filters. Each of the third anti-color filters may be proximate a corresponding instance (or group of instances) of a third plurality of optical sensor pixels. In some such implementations, each of the third anti-color filters may be configured to at least partially suppress transmission of light in a third optical wavelength range. Alternatively, or additionally, in some implementations the third plurality of third anti-color filter regions may include one or more substantially transparent regions.

Some implementations of the anti-color filter array 107 may include more than three anti-color filter regions. Some such implementations may include one or more substantially transparent regions and/or an $N^{th}$ plurality of $N^{th}$ anti-color filters, where N is an integer greater than or equal to four. Each of the $N^{th}$ anti-color filters may be configured to at least partially suppress transmission of light in an $N^{th}$ optical wavelength range.

The control system 110 may be configured to communicate with the array of optical sensor pixels 105 via wired communication and/or wireless communication. As used herein, the term "coupled to" includes being physically coupled for wired communication as well as being configured for wireless communication.

According to some implementations, the apparatus 100 may be a single device, whereas in other implementations the apparatus 100 may include more than one device. Accordingly, the terms "apparatus" and "system" may be used interchangeably herein. In other examples, the apparatus 100 may be a component of another device. For example, in some implementations at least a portion of the array of optical sensor pixels 105 and/or the control system 110 may be included in more than one apparatus. In some examples, a second device may include some or all of the control system 110, but may not include the array of optical sensor pixels 105. However, the control system 110 may nonetheless be configured to communicate with the array of optical sensor pixels 105.

The control system 110 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 110 also may include (and/or be configured for communication with) one or more memory devices, such as one or more random access memory (RAM) devices, read-only memory (ROM) devices and/or other types of non-transitory media. Accordingly, the apparatus 100 may have a memory system that includes one or more memory devices, though the memory system is not shown in FIG. 1A.

The control system 110 may be capable of performing, at least in part, the methods disclosed herein. In some examples, the control system 110 may be capable of performing some or all of the methods described herein according to instructions (e.g., software) stored on non-transitory media. For example, the control system 110 may be configured for controlling the array of optical sensor pixels 105 and/or for receiving and processing data from at least a portion of the array of optical sensor pixels 105, e.g., as described below.

In some examples, the array of optical sensor pixels 105 may be part of an image sensor that includes one or more lenses. Although shown as separate components in FIG. 1A, the array of optical sensor pixels 105 may, in some examples, include at least a portion of the control system 110. For example, the array of optical sensor pixels 105 may include one or more processors in some instances. According to some implementations, the array of optical sensor pixels 105 may include a complementary metal-oxide-semiconductor (CMOS) sensor. Some such implementations of the array of optical sensor pixels 105 may include a processor configured to control exposure settings. The sensor and the processor may or may not reside on the same die, depending on the particular implementation. In some examples, the array of optical sensor pixels 105 may be, or may include, Qualcomm's Glance image sensor, one implementation of which has a 320 by 240 array of pixels and an 8-bit width, and consumes milliwatts of power, including the power used by the optical sensor and the power consumed by associated processing. By way of comparison, a camera module in a smartphone generally consumes hundreds of milliwatts of power, or in some cases watts of power.

In some examples, the interface system 112 may include a wireless interface system. In some implementations, the interface system 112 may include a network interface, an interface between the control system 110 and the array of optical sensor pixels 105, an interface between the control system 110 and a memory system and/or an interface between the control system 110 and an external device interface (e.g., a port or an applications processor). In some examples, the interface system 112 may include one or more user interfaces, such as a display, a touch screen, a microphone, etc.

Figure 1B:
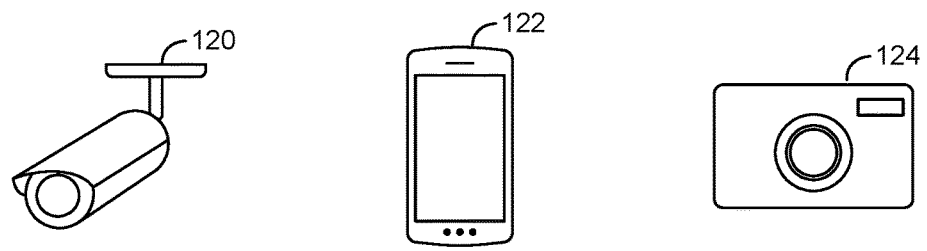
FIG. 1B illustrates some examples of devices that may include an apparatus as shown in FIG. 1A.

FIG. 1B illustrates some examples of devices that may include the apparatus 100 as shown in FIG. 1A. For example, a security camera 120 may include the apparatus 100. The security camera 120 may be attached to a residence, business, a public structure, for instance. A mobile phone 122 may include the apparatus 100. The mobile device 122 may be carried by a user and may be connected to a communications network such as a cellular network, e.g., an Long-Term Evolution (LTE) or fifth generation (5G) network based on a standard provided by the 3rd Generation Partnership Project (3GPP), a wireless wide area network (WLAN), wireless local area network (WLAN), or some other network. A camera 124 may include the apparatus 100. The camera 124 may be a stand-alone device, such as a hand-held camera, baby monitor, etc. The camera 124 may also be connected to and/or be part of a larger system, such as a vehicular system, an Internet-of-Things (IoT) device, etc. Many other types of devices may also include the apparatus 100 shown in FIG. 1A.

Figure 2:
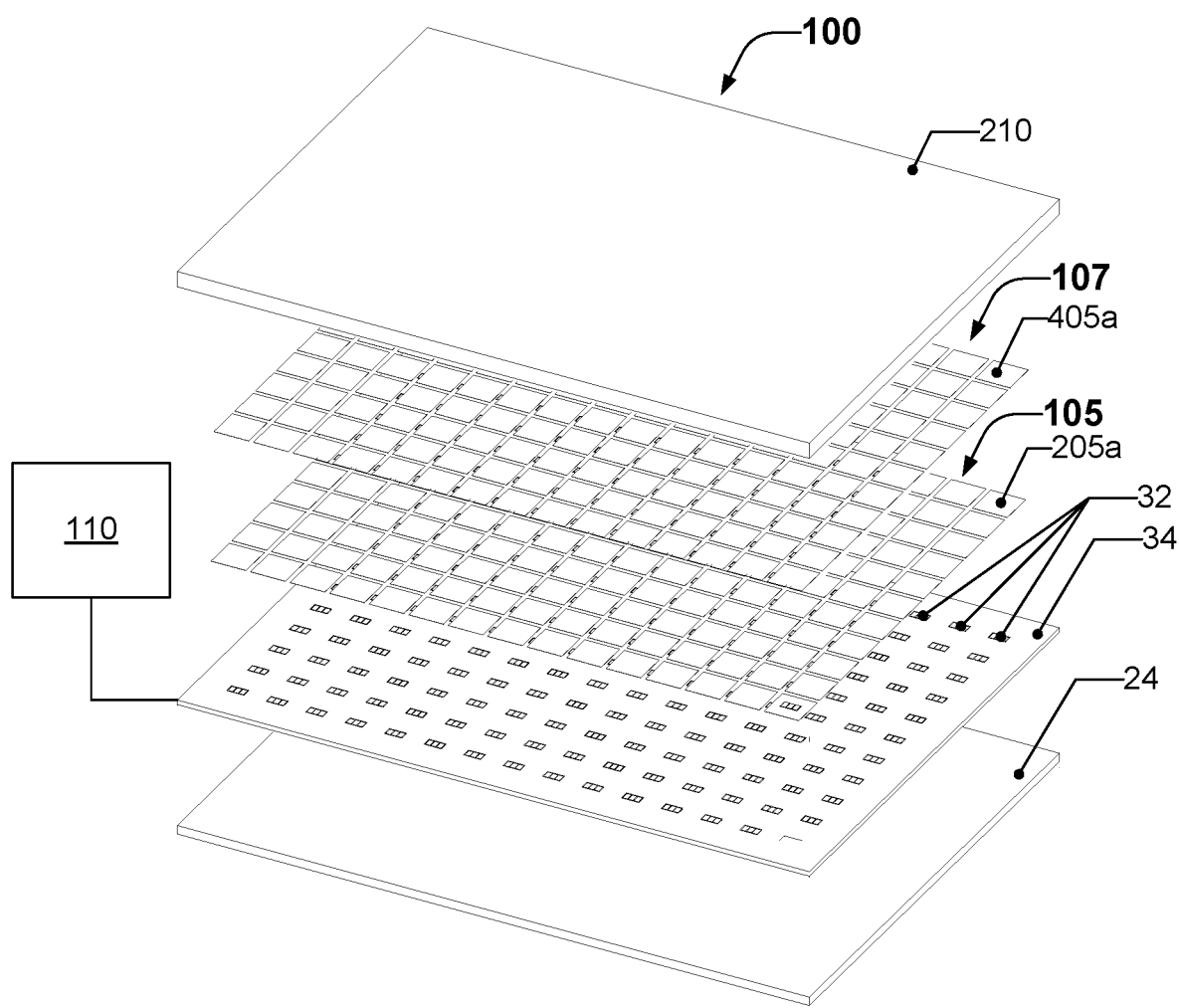
FIG. 2 shows an example of an exploded view of an apparatus according to some implementations.

FIG. 2 shows an example of an exploded view of an apparatus according to some implementations. According to some implementations, the apparatus 100 in FIG. 2 may be an example of the apparatus 100 that is shown in FIG. 1A and described above. In this example, the apparatus 100 includes an array of optical sensor pixels 105, an anti-color filter array 107 proximate the array of optical sensor pixels 105 and a cover layer 210 proximate the anti-color filter array 107. The cover layer 210 may be formed of any suitable transparent or substantially transparent material, such as glass, plastic, etc.

According to this implementation, there is a one-to-one correspondence between individual anti-color filter regions of the anti-color filter array 107 and individual optical sensor pixels of the array of optical sensor pixels 105. For example, when the apparatus 100 is configured for operation, the anti-color filter region 405a is adjacent to the optical sensor pixel 205a. However, in other implementations there may not be a one-to-one correspondence between individual anti-color filter regions and optical sensor pixels. For example, in some implementations, multiple optical sensor pixels may correspond with a single anti-color filter region, or vice versa.

According to this implementation, the apparatus 100 includes an array of optical sensor pixel circuits 32 disposed on a substrate 34, which also may be referred to as a backplane. In this implementation, an outer substrate 24 is proximate the backplane. The outer substrate 24 may be formed of any suitable protective material, such as plastic, glass, metal, etc. In this example, each of the optical sensor pixel circuits 32 corresponds to, and is electrically connected to, a corresponding one of the optical sensor pixels of the array of optical sensor pixels 105. In some implementations, each sensor pixel circuit 32 may include one or more TFT elements, electrical interconnect traces and, in some implementations, one or more additional circuit elements such as diodes, capacitors, etc. According to this example, the apparatus 100 includes a control system 110 that is configured to communicate with the array of optical sensor pixels 105 via the sensor pixel circuits 32 on the substrate 34.

The control system 110 may be configured to operate as disclosed herein, e.g., as described above with reference to method 200. For example, the control system 106 may be configured for receiving optical sensor pixel values from the array of optical sensor pixels 105 (in this example, via the sensor pixel circuits 32), for analyzing the optical sensor pixel values to detect at least a first object and for determining first object color information.

Figure 3A:
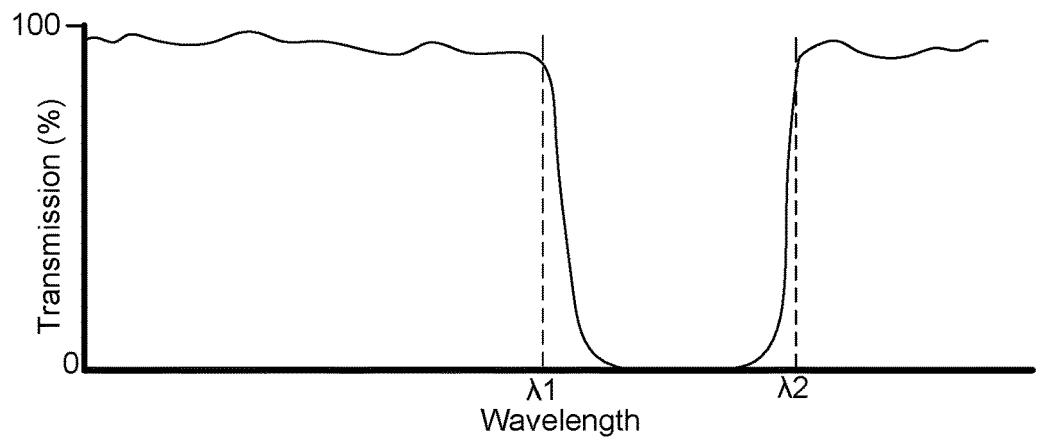
FIGS. 3A, 3B, and 3C shows examples of varying degrees of transmission of different anti-color filters within some parts of a wavelength range between $\lambda 1$ and $\lambda$.
Figure 3B:
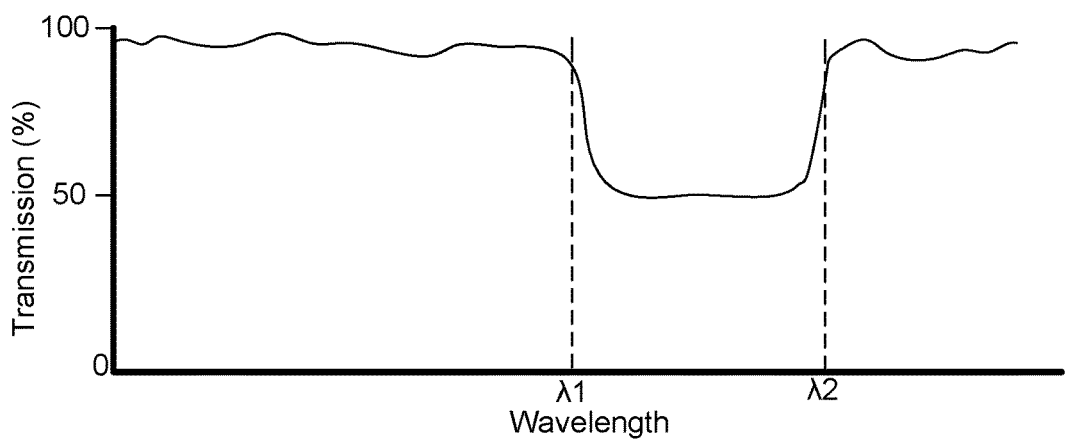
Figure 3C:
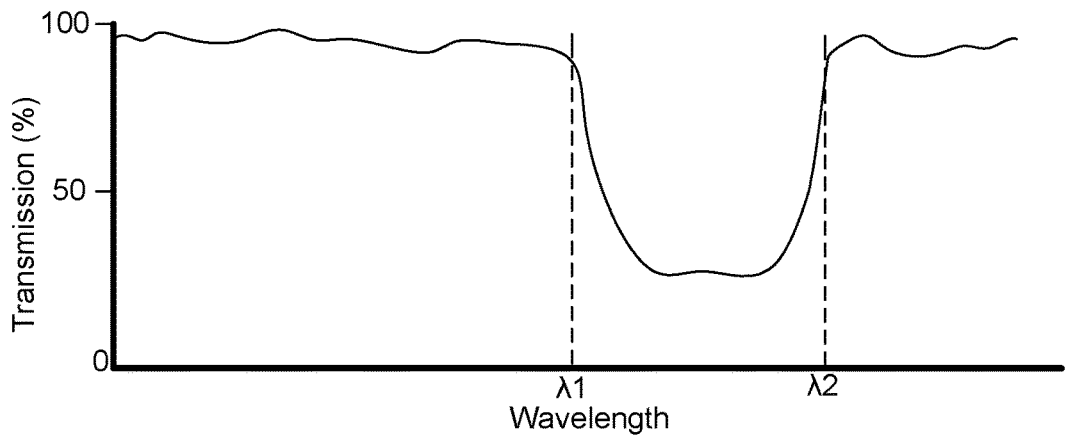

FIGS. 3A, 3B and 3C are graphs that show examples of the transmission of light by anti-color filters as functions of wavelength. The details of each graph, including the transmission within and outside of the wavelength range between λ1 and λ2, as well as the wavelength range between areas of minimum transmission and areas of maximum transmission, are merely made by way of example. As noted elsewhere herein, the term "anti-color filter" as used in this disclosure refers generally to a filter that is configured to at least partially suppress transmission of light in a wavelength range. In the examples shown in FIGS. 3A-3C, the wavelength range is between wavelength λ1 and wavelength λ2. In some instances, the wavelength range between λ1 and λ2 may correspond to, or be within the range of, a color of the visible spectrum, such as violet (380-450 nm), blue (450-485 nm), cyan (485-500 nm), green (500-565 nm), yellow (565-590 nm), orange (590-625 nm) or red (625-740 nm).

More generally speaking, the wavelengths λ1 and λ2 may define a band of wavelengths in which the attenuation provided by the filter exceeds a certain threshold. The band may be referred to as a "rejection band" of the filter. Conversely, at wavelengths outside the rejection band, the attention provided by the anti-color filter does not exceed the threshold. In at least one embodiment, the rejection band may be flanked by a first passband and a second passband. Thus, the attenuation provided by the anti-color filter may exceed the threshold within the rejection band and be at or below the threshold within the first passband and the second passband. The threshold may be selected as a particular value such as 3 dB, 6 dB, 9 dB, 12 dB, 15 dB, or some other value. An anti-color filter may thus be characterized, at least in part, by a rejection band associated with the filter. In at least one embodiment, an anti-color filter may be characterized, at least in part, by a rejection band, a first passband, and a second passband associated with the filter.

Accordingly, the values of λ1 and λ2 may vary according to the particular implementation. In one example of an "anti-red filter," λ1 may be 600 nm and λ2 may be 780 nm. In another example of an "anti-red filter," λ1 may be 600 nm and λ2 may be 800 nm. In another example of an "anti-red filter," λ1 may be 620 nm and λ2 may be 750 nm. In some implementations, the relevant optical wavelength range may correspond to a wavelength range that is shorter or longer than the wavelength range of the visible spectrum, such as an infrared or ultraviolet wavelength range. The relevant optical wavelength range may, for example, correspond to a wavelength range that is detectable by optical sensor pixels of the apparatus 100.

FIG. 3A shows an example in which the transmission of light by an anti-color filter approaches zero percent within some parts of the wavelength range between λ1 and λ2. Outside this wavelength range, the transmission of light by the anti-color filter is generally between 90% and 100%. FIG. 3B shows an example in which the transmission of light by an anti-color filter is reduced to approximately fifty percent within some parts of the wavelength range between λ1 and λ2. Outside this wavelength range, the transmission of light by the anti-color filter is generally between 90% and 100%. FIG. 3C shows an example in which the transmission of light by an anti-color filter is reduced to approximately seventy-five percent within some parts of the wavelength range between λ1 and λ2. Outside this wavelength range, the transmission of light by the anti-color filter is generally between 90% and 100%.

Figure 4A:
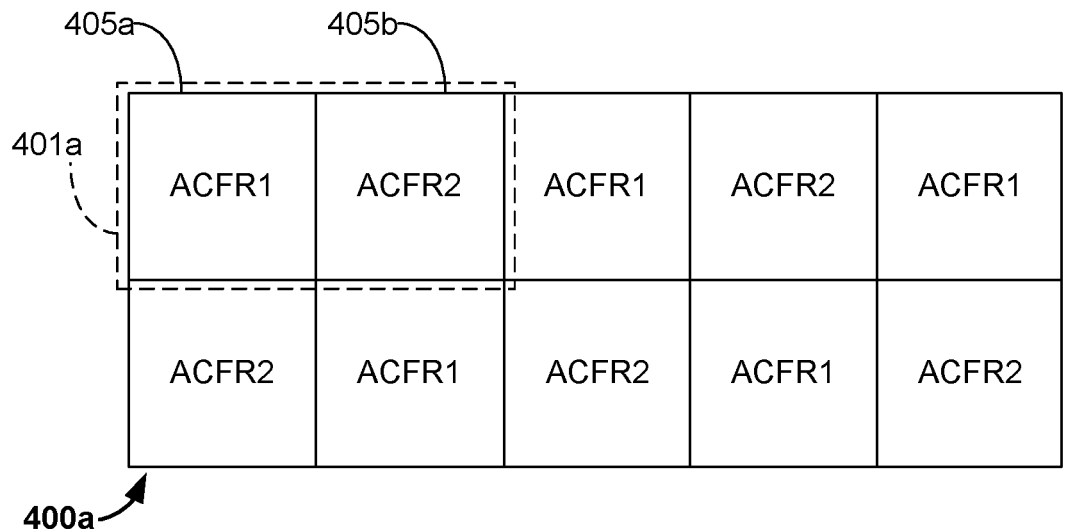
FIGS. 4A, 4B and 4C show examples of various arrangements of anti-color filter regions.
Figure 4B:
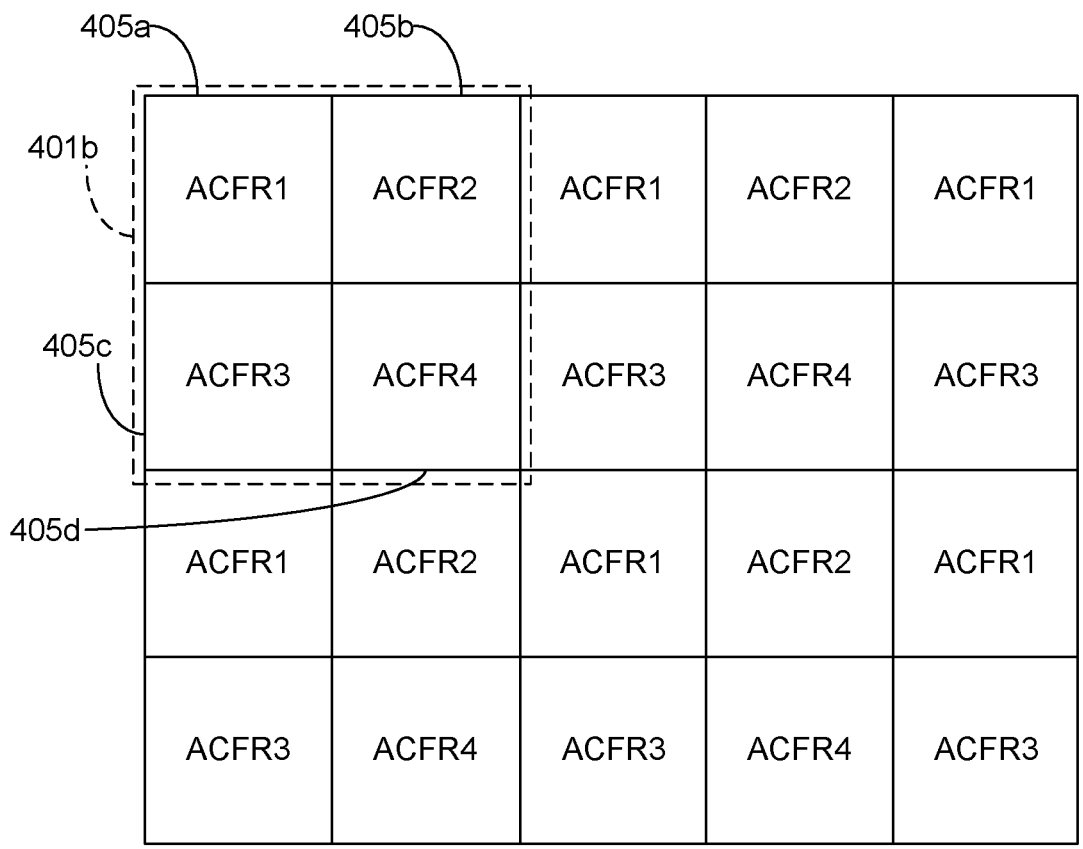
Figure 4C:
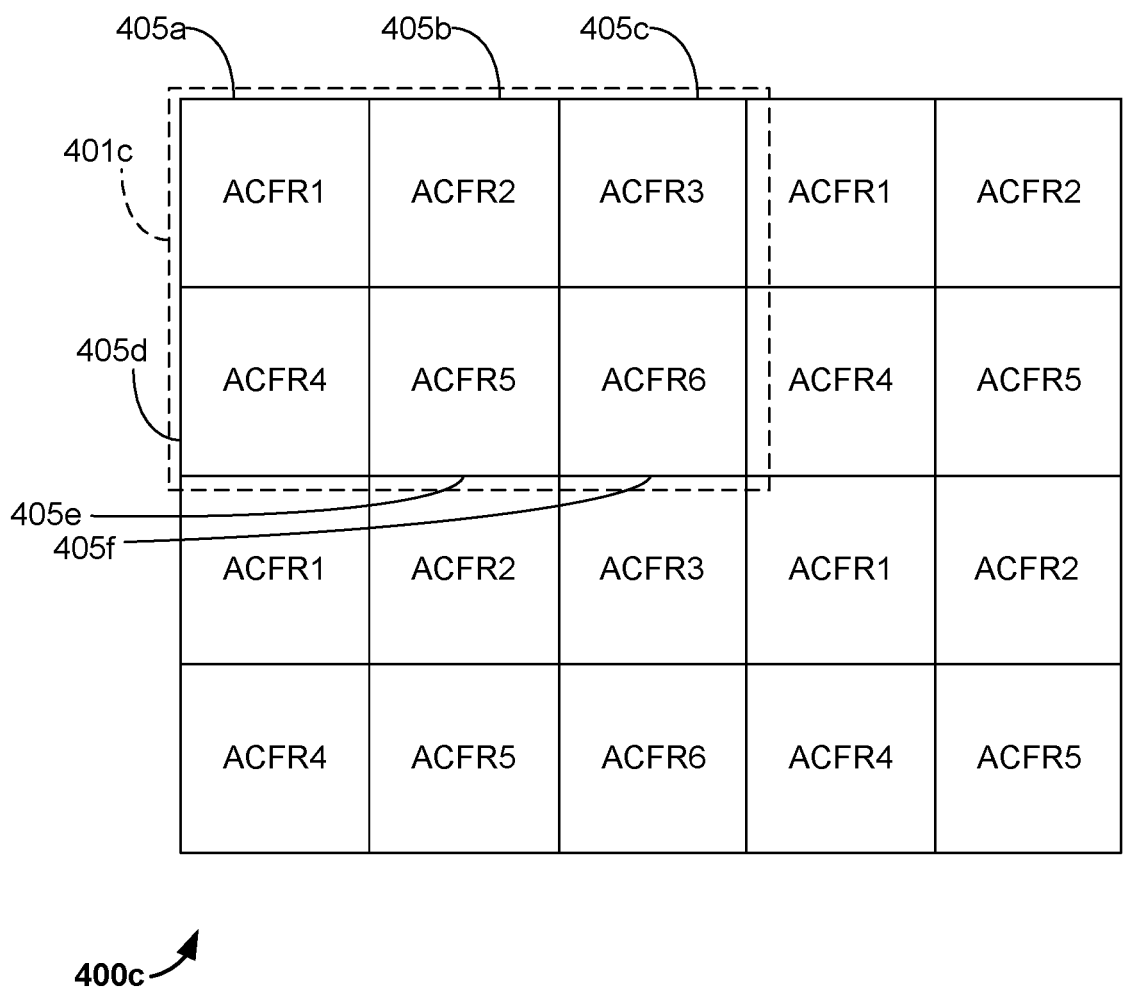

FIGS. 4A, 4B and 4C show examples of various arrangements of anti-color filter regions. Each of these examples includes groups of identical anti-color filter patterns. As with other figures presented herein, the particular types and arrangements of anti-color filter regions that are shown in FIGS. 4A, 4B and 4C (and described with reference to FIGS. 4A, 4B and 4C) are merely non-limiting examples. In these examples, the anti-color filter array portions 400a, 400b and 400c are only parts of complete anti-color filter arrays 107.

FIG. 4A shows an anti-color filter array portion 400a. According to this implementation, the anti-color filter array portion 400a includes multiple instances of the anti-color filter pattern 401a. In this example, the anti-color filter pattern 401a includes a first anti-color filter region 405a (ACFR1) and a second anti-color filter region 405b (ACFR2). In some examples, each of the first anti-color filter regions 405a may include a first anti-color filter being configured to at least partially suppress transmission of light in a first optical wavelength range and each of the second anti-color filter regions 405b may include a second anti-color filter being configured to at least partially suppress transmission of light in a second optical wavelength range. However, in other examples either the first anti-color filter regions 405a or the second anti-color filter regions 405b may be transparent, or substantially transparent.

FIG. 4B shows an anti-color filter array portion 400b. According to this implementation, the anti-color filter array portion 400b includes multiple instances of the anti-color filter pattern 401b. In this example, the anti-color filter pattern 401b includes a first anti-color filter region 405a, a second anti-color filter region 405b, a third anti-color filter region 405c and a fourth anti-color filter region 405d. In some examples, each of the first anti-color filter regions 405a may include a first anti-color filter being configured to at least partially suppress transmission of light in a first optical wavelength range, each of the second anti-color filter regions 405b may include a second anti-color filter being configured to at least partially suppress transmission of light in a second optical wavelength range, each of the third anti-color filter regions 405c may include a third anti-color filter being configured to at least partially suppress transmission of light in a third optical wavelength range and each of the fourth anti-color filter regions 405d may include a fourth anti-color filter being configured to at least partially suppress transmission of light in a fourth optical wavelength range.

However, in other examples one or more of the first anti-color filter regions 405a, the second anti-color filter regions 405b, the third anti-color filter regions 405c or the fourth anti-color filter regions 405d may be transparent, or substantially transparent. In one such example, each of the first anti-color filter regions 405a includes a first anti-color filter being configured to at least partially suppress transmission of light in a first optical wavelength range, but the second anti-color filter regions 405b, the third anti-color filter regions 405c and the fourth anti-color filter regions 405d are transparent, or substantially transparent.

In another example of the anti-color filter pattern 401b, one of the anti-color filter regions is configured to at least partially suppress transmission of light in a first optical wavelength range and another of the anti-color filter regions is configured to at least partially suppress transmission of light in a second, third or fourth optical wavelength range. However, in this example the other two anti-color filter regions of the anti-color filter pattern 401b are transparent, or substantially transparent.

In an alternative example of the anti-color filter pattern 401b, one of the anti-color filter regions is configured to at least partially suppress transmission of light in a first optical wavelength range, another of the anti-color filter regions is configured to at least partially suppress transmission of light in a second optical wavelength range and another of the anti-color filter regions is configured to at least partially suppress transmission of light in a third optical wavelength range. However, in this example the other anti-color filter region of the anti-color filter pattern 401b is transparent, or substantially transparent.

FIG. 4C shows an anti-color filter array portion 400c. According to this implementation, the anti-color filter array portion 400c includes multiple instances of the anti-color filter pattern 401c. In this example, the anti-color filter pattern 401c includes a first anti-color filter region 405a, a second anti-color filter region 405b, a third anti-color filter region 405c, a fourth anti-color filter region 405d, a fifth anti-color filter region 405e and a sixth anti-color filter region 405f. In some examples, each of the first anti-color filter regions 405a may include a first anti-color filter being configured to at least partially suppress transmission of light in a first optical wavelength range, each of the second anti-color filter regions 405b may include a second anti-color filter being configured to at least partially suppress transmission of light in a second optical wavelength range, each of the third anti-color filter regions 405c may include a third anti-color filter being configured to at least partially suppress transmission of light in a third optical wavelength range, each of the fourth anti-color filter regions 405d may include a fourth anti-color filter being configured to at least partially suppress transmission of light in a fourth optical wavelength range, each of the fifth anti-color filter regions 405e may include a fifth anti-color filter being configured to at least partially suppress transmission of light in a fifth optical wavelength range and each of the sixth anti-color filter regions 405f may include a sixth anti-color filter being configured to at least partially suppress transmission of light in a sixth optical wavelength range.

However, in other examples one or more of the anti-color filter regions of the anti-color filter pattern 401c may be transparent, or substantially transparent. In one such example, each of the first anti-color filter regions 405a includes a first anti-color filter being configured to at least partially suppress transmission of light in a first optical wavelength range, but all of the other anti-color filter regions are transparent, or substantially transparent.

In another example of the anti-color filter pattern 401c, one of the anti-color filter regions is configured to at least partially suppress transmission of light in a first optical wavelength range and another of the anti-color filter regions is configured to at least partially suppress transmission of light in another optical wavelength range. However, in this example the other four anti-color filter regions of the anti-color filter pattern 401c are transparent, or substantially transparent.

In an alternative example of the anti-color filter pattern 401c, one of the anti-color filter regions is configured to at least partially suppress transmission of light in a first optical wavelength range, another of the anti-color filter regions is configured to at least partially suppress transmission of light in a second optical wavelength range and another of the anti-color filter regions is configured to at least partially suppress transmission of light in a third optical wavelength range. However, in this example the other three anti-color filter regions of the anti-color filter pattern 401c are transparent, or substantially transparent.

In an alternative example of the anti-color filter pattern 401c, one of the anti-color filter regions is configured to at least partially suppress transmission of light in a first optical wavelength range, another of the anti-color filter regions is configured to at least partially suppress transmission of light in a second optical wavelength range, another of the anti-color filter regions is configured to at least partially suppress transmission of light in a third optical wavelength range and another of the anti-color filter regions is configured to at least partially suppress transmission of light in a fourth optical wavelength range. However, in this example the other two anti-color filter regions of the anti-color filter pattern 401c are transparent, or substantially transparent.

In an alternative example of the anti-color filter pattern 401c, one of the anti-color filter regions is configured to at least partially suppress transmission of light in a first optical wavelength range, another of the anti-color filter regions is configured to at least partially suppress transmission of light in a second optical wavelength range, another of the anti-color filter regions is configured to at least partially suppress transmission of light in a third optical wavelength range, another of the anti-color filter regions is configured to at least partially suppress transmission of light in a fourth optical wavelength range and another of the anti-color filter regions is configured to at least partially suppress transmission of light in a fifth optical wavelength range. However, in this example the other anti-color filter region of the anti-color filter pattern 401c is transparent, or substantially transparent.

Figure 5:
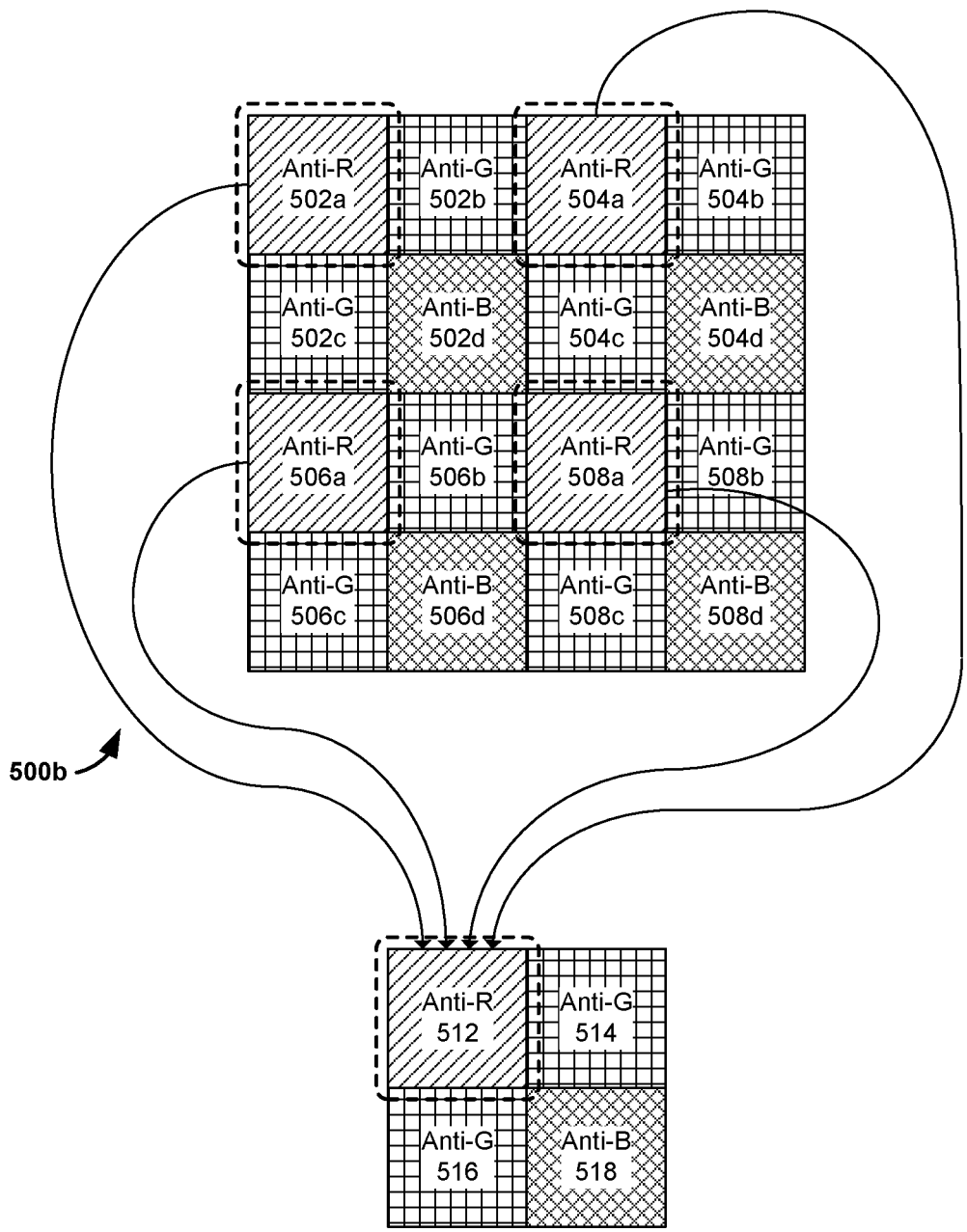
FIG. 5 shows an example of binning pixel signals associated with non-adjacent anti-color filters corresponding to similar rejection bands.

FIG. 5 shows an example of binning pixel signals associated with non-adjacent anti-color filters corresponding to similar rejection bands. A portion 500b of an array of filters is illustrated. In this example, an anti-color filter pattern is shown as a 2×2 pattern that comprises an anti-red filter 502a, an anti-green filter 502b, another anti-green filter 502c, and an anti-blue filter 502d. The array of filters may comprise multiple instances of such a 2×2 anti-color filter pattern. Here, binning is performed to combine pixel signals associated with four non-adjacent anti-color filters of a particular anti-color (e.g., red), to generate a binned anti-color pixel value.

Figure 10:
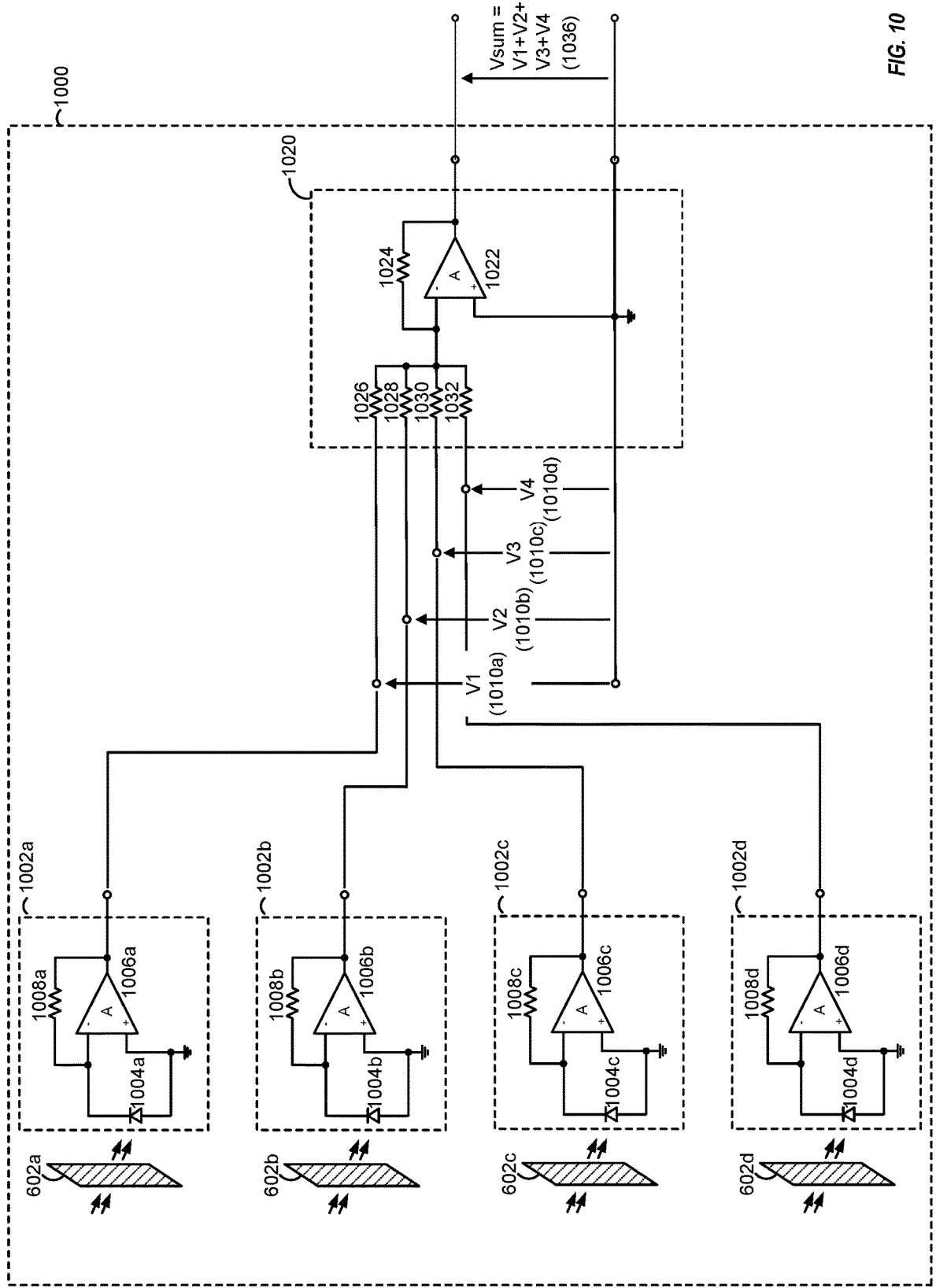
FIG. 10 is a circuit diagram showing a portion 1000 of an optical sensor unit configured to generate a binned pixel value by combining pixel signals using analog circuitry.
Figure 11:
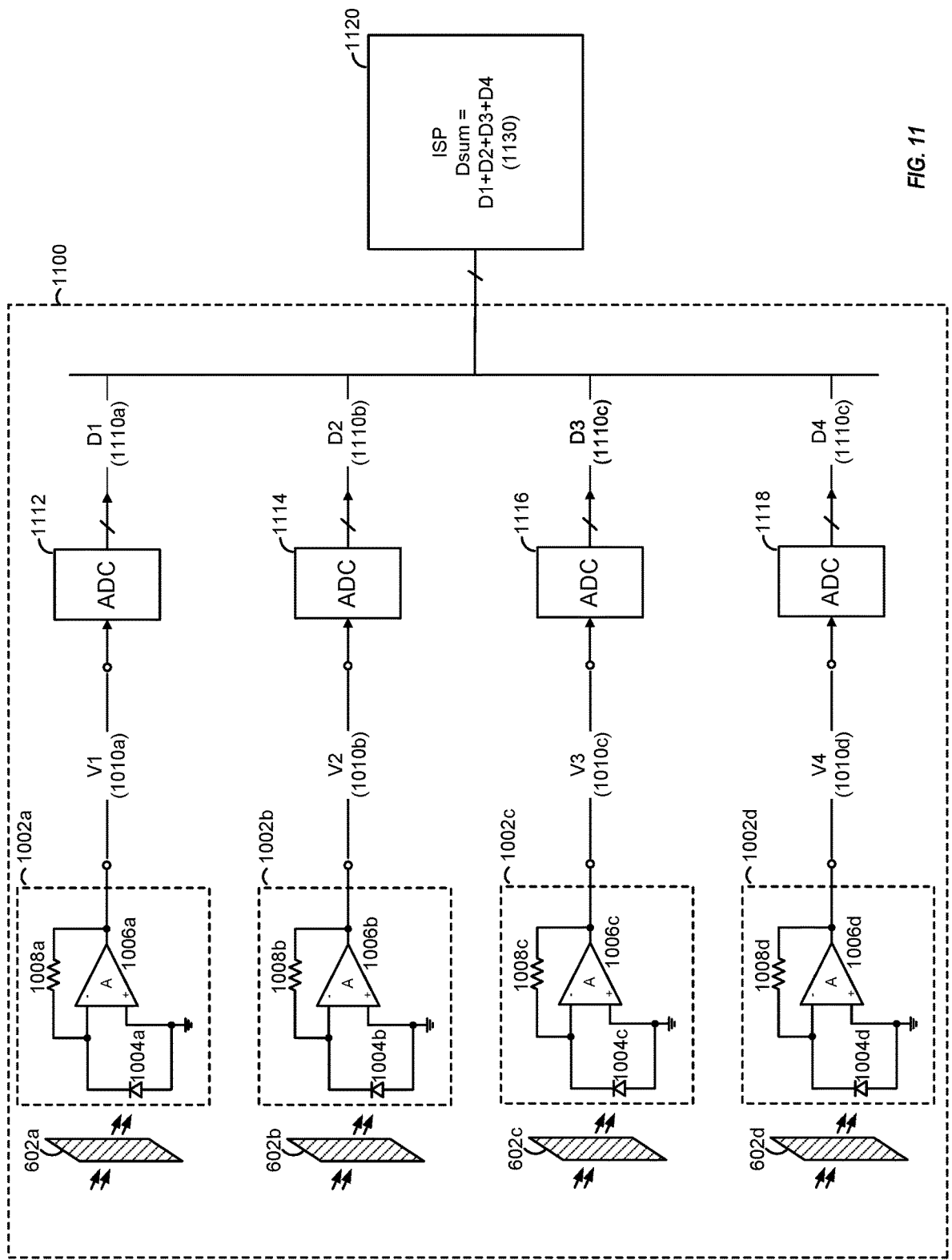
FIG. 11 is a circuit diagram showing a portion 1100 of an optical sensor unit configured to convert pixels signals from analog to digital signals, which may be combined using digital circuitry.

In FIG. 5 and subsequent figures, pixel signals "associated with" an anti-color filter may refer to pixel signals generated at an optical pixel sensor based on a portion of light that has been filtered using the anti-color filter (e.g., as shown in FIGS. 10 and 11). Referring back to the example shown in FIG. 5, the four anti-color filters are each associated with a similar rejection band, i.e., a band that corresponds to wavelengths associated with the color red. In this example, the four non-adjacent anti-color filters comprise anti-red filters 502a, 504a, 506a, and 508a. The four anti-red filters belong, respectively, to four different instances of the 2×2 anti-color filter pattern. The binning operation results in a binned anti-red pixel value 512.

A similar binning operation may be performed for each of the other anti-colors. For example, binning may be performed to combine pixels signals from non-adjacent anti-green filters 502b, 504b, 506b, and 508b to generate a first binned anti-green pixel value 514. Binning may be performed to combine pixel signals associated with non-adjacent anti-green filters 502c, 504c, 506c, and 508c to generate a second binned anti-green pixel value 516. Also, binning may be performed to combine pixel signals associated with non-adjacent anti-blue filters 502d, 504d, 506d, and 508d to generate a binned anti-blue pixel value 518.

Here, "binning" refers generally to a process for combining the signals associated with multiple pixel sensors to improve signal quality. Such combining may comprise simply adding pixel signals together, averaging pixel signals, or otherwise bringing pixels together to improve the signal—e.g., to improve signal strength, signal-to-noise ratio, or some other measure of signal quality. Pixel signals may be binned in analog form by using analog circuitry (e.g., FIG. 10), in digital form by using digital circuitry (e.g., FIG. 11), or by use of a combination of analog and digital circuitry, as discussed in later sections. The binning operation reduces the resolution of the resulting anti-color image. In the example shown in FIG. 5, four anti-color pixels are binned into one anti-color value. As such, a 4-to-1 reduction in resolution may be experienced. In some instances, the reduction in resolution may be desired, e.g., to reduce compute, memory, time, power, and/or other resource needs associated with image operations. In other instances, the reduction in resolution is an accepted tradeoff for improved signal strength. Indeed, signal strength may be significantly boosted by the binning operation, as a result of collecting more photons. For example, in scenarios involving reduced sensor area, low illumination, and/or short exposure time, etc., such a boost in signal strength may be particularly beneficial, even if achieved at the cost of reduced image resolution. Here, the resulting anti-color image comprises, for example, anti-color pixel values 512, 514, 516, and 518.

Figure 6:
FIG. 6 shows an example of binning pixel signals associated with adjacent anti-color filters corresponding to different rejection bands.
Figure 6:
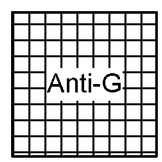
Figure 6:
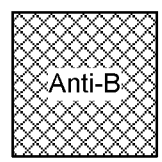
Figure 6:
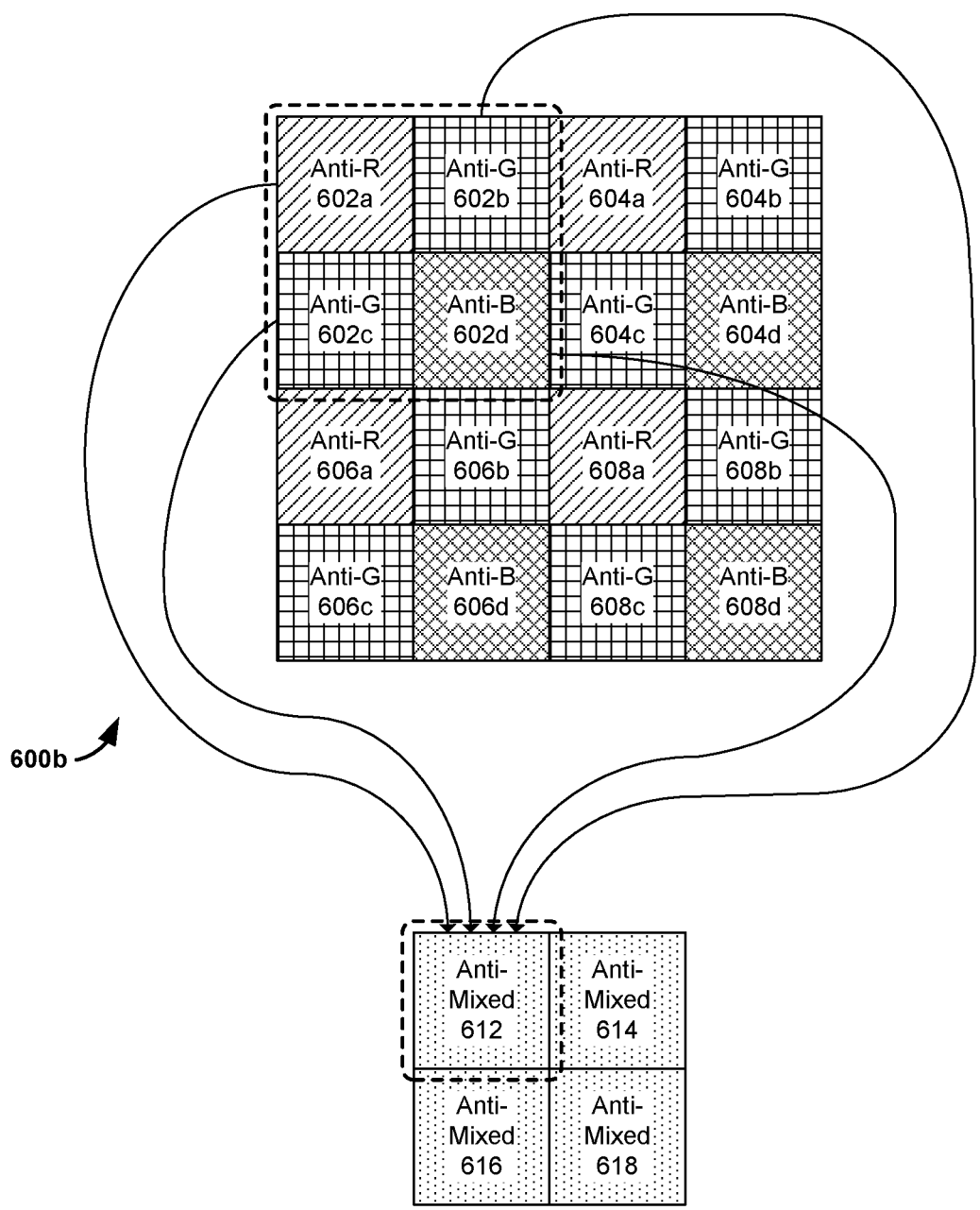

FIG. 6 shows an example of binning pixel signals associated with adjacent anti-color filters corresponding to different rejection bands. A portion 600*b* of an array of filters is illustrated. FIG. 6 presents multiple instances of a 2×2 anti-color filter pattern similar to the 2×2 anti-color filter pattern shown in FIG. 5. However, binning is performed in FIG. 6 to combine pixel signals associated with adjacent anti-color filters corresponding to different anti-colors. For example, pixels signals from four adjacent anti-color filters, such as an anti-red filter 602*a*, an anti-green filter 602*b*, another anti-green filter 602*c*, and an anti-blue filter 602*d*, may be combined to generate a binned anti-mixed color pixel value 612.

A similar binning operation may be performed for other groups of adjacent anti-color filters corresponding to different anti-colors. For example, pixels signals from another group of four adjacent anti-color filters having different rejection bands, such as an anti-red filter 604*a*, an anti-green filter 604*b*, another anti-green filter 604*c*, and an anti-blue filter 604*d*, may be combined to generate a binned anti-mixed color pixel value 614. Pixels signals from an anti-red filter 606*a*, an anti-green filter 606*b*, another anti-green filter 606*c*, and an anti-blue filter 606*d*, may be combined to generate a binned anti-mixed color pixel value 616. Also, pixels signals from an anti-red filter 608*a*, an anti-green filter 608*b*, another anti-green filter 608*c*, and an anti-blue filter 608*d*, may be combined to generate a binned anti-mixed color pixel value 618.

The binning of pixel signals associated with anti-color filters having different anti-colors, i.e., different rejection bands, results in a mixed anti-color output. That is, the binning operation may cause color-specific information (i.e., anti-color specific information) to become lost. Even though color-specific information is lost, the gain in signal strength, signal-to-noise ratio, etc., may nevertheless justify the combining of pixel signals associated with anti-color filters corresponding to different anti-colors, according to certain embodiments of the disclosure. For example, each of the anti-mixed color pixel values 612, 614, 616, and 618 may have lost anti-color specific information, as result of binning pixel signals associated with anti-color filters having different anti-colors (e.g., anti-red filter 602*a*, anti-green filter 602*b*, anti-green filter 602*c*, and anti-blue filter 602*d*). However, the anti-mixed color pixel values 612, 614, 616, and 618 have increased signal strength and may be very useful for performing image operations that do not require color information. In one example, the anti-mixed color pixel values may be used for object detection based on a machine learning (ML) process that does not require color information. For instance, an ML-based detector may detect an image as an image of an apple (e.g., based on brightness information that convey the shape, shading, and other appearance characteristics of the object), even if no color or anti-color information is available. Here, brightness information may comprise a measure of absolute brightness or relative brightness, e.g., as compared to a reference brightness level. A more detailed discussion relating to object detection using anti-mixed pixel values is provided later in the context of FIG. 12.

Figure 7:
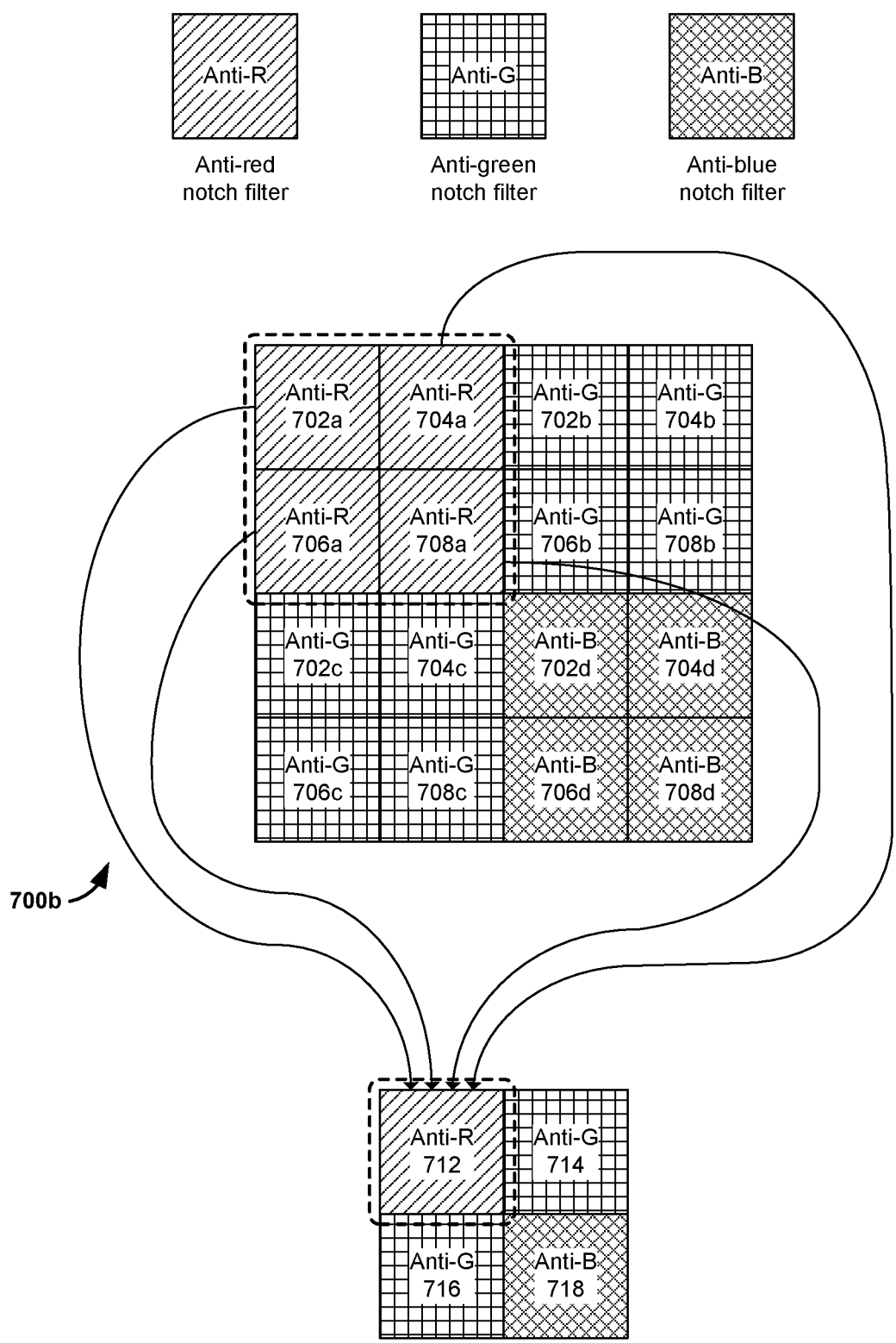
FIG. 7 shows an example of binning pixel signals associated with adjacent anti-color filters corresponding to a similar rejection band.

FIG. 7 shows an example of binning pixel signals associated with adjacent anti-color filters corresponding to a similar rejection band. A portion 700*b* of an array of filters is illustrated. Here, FIG. 7 present a 4×4 anti-color filter pattern. Binning is performed to combine pixel signals associated with adjacent anti-color filters corresponding to the same anti-color. In this particular case, pixel signals associated with each 2×2 portion (corresponding to a particular anti-color) of the 4×4 anti-color filter pattern is binned. For example, pixel signals associated with four adjacent anti-color filters, such as anti-red filters 702*a*, 704*a*, 706*a*, and 708*a* may be combined to generate a binned anti-red pixel value 712. A similar binning operation may be performed to generate each of the other binned anti-color pixel values, including a binned anti-green pixel value 714, another binned anti-green pixel value 716, and a binned anti-blue pixel value 718.

The binning technique illustrated in FIG. 7 may be associated with improved spatial resolution. The anti-red pixel value 712 results from binning of pixels signals from a tightly co-located group of anti-red filters, i.e., anti-red filters 702*a*, 704*a*, 706*a*, and 708*a*. That is, the binned "pixel" represented by the binned anti-red pixel value 712 corresponds to a compact group of pixels that does not overlap with other groups of pixels in the original image. As such, the pixel signal associated with the binned anti-red pixel value 712 is well-localized. By contrast, in FIG. 5, the anti-red pixel value 512 results from binning pixel signals associated with a relatively dispersed group of anti-red filters, i.e., anti-red filters 502*a*, 504*a*, 506*a*, and 508*a*. The binned "pixel" represented by the binned anti-pixel value 512 corresponds to a group of pixels that overlaps with other groups of pixels in the original image. Thus, the pixel signal associated with the binned anti-red pixel value 512 is not as well-localized in comparison. Consequently, an imaged formed using, at least in part, the binned anti-color pixel values 512, 514, 516, and 518 shown in FIG. 5 may be associated with poorer spatial resolution, when compared to an image formed using, at least in part, the binned anti-color pixel values 712, 714, 716, and 718 shown in FIG. 7.

Figure 8:
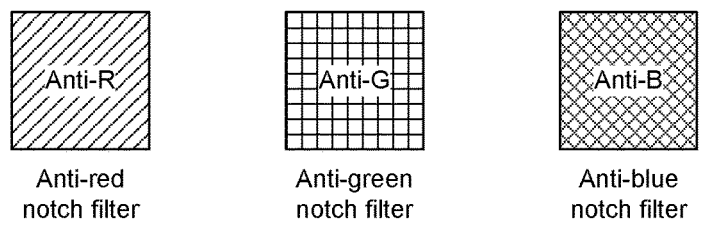
FIG. 8 shows an example of a first level of binning and a second level of binning using pixel signals associated with various anti-color filters.
Figure 8:
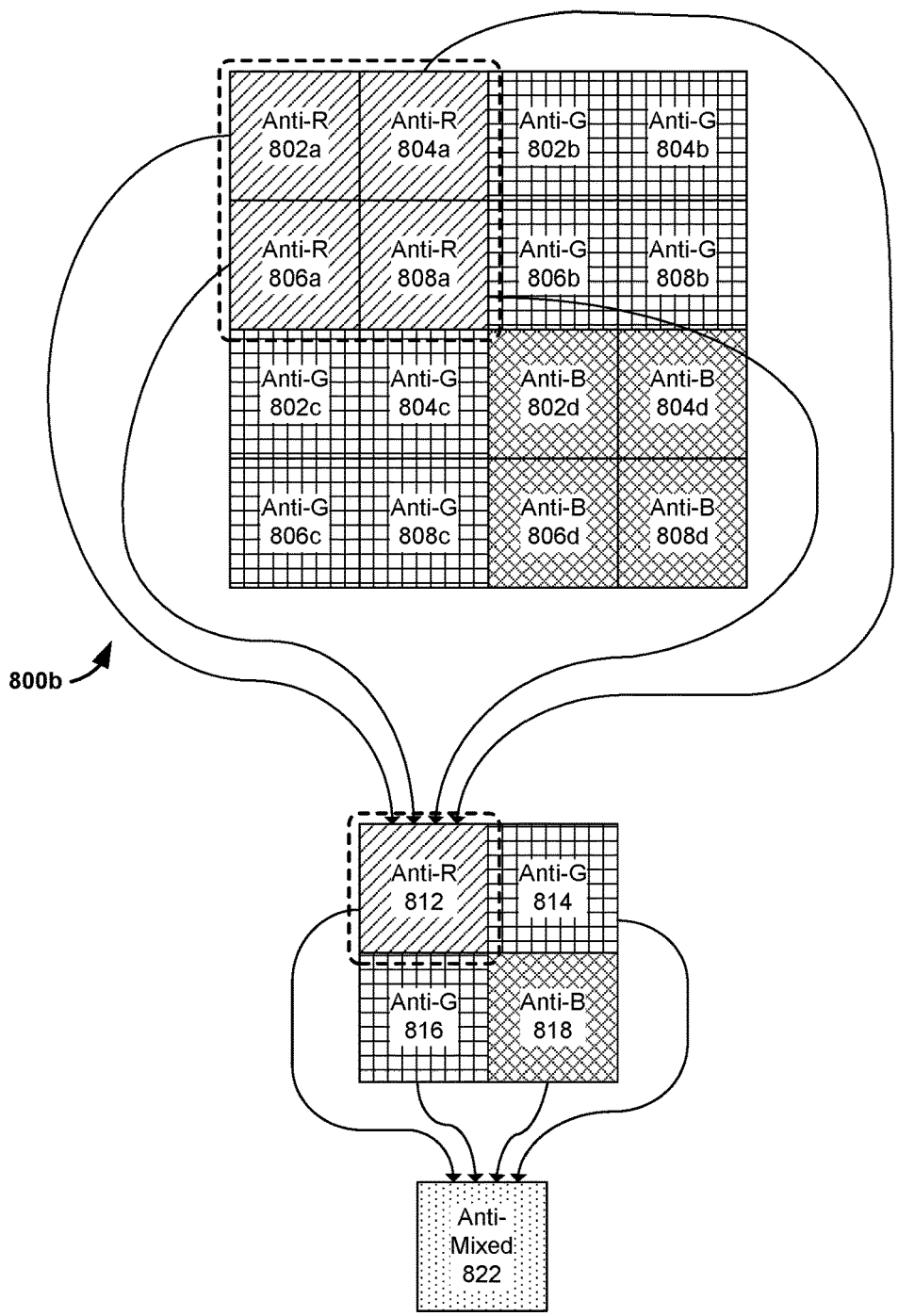

FIG. 8 shows an example of a first level of binning and a second level of binning using pixel signals associated with various anti-color filters. A portion 800*b* of an array of filters is illustrated. Here, the portion 800*b* is similar to the portion 700*b* presented in FIG. 7. That is, FIG. 8 presents a similar 4×4 anti-color filter pattern as FIG. 7. At a first level of binning, pixel signals associated with each 2×2 portion (corresponding to a particular anti-color) of the 4×4 anti-color filter pattern is binned. For example, pixel signals associated with four adjacent anti-color filters, such as anti-red filters 802a, 804a, 806a, and 808a may be combined to generate a binned anti-red pixel value 812. The first level binning may thus result in a first binned pixel value 812 (anti-red), a second binned pixel value 814 (anti-green), a third binned pixel value 816 (anti-green), and a fourth binned pixel value 818 (anti-blue).

At the second level of binning, pixel values from the first level of binning may be combined to generate a second-level binned anti-color pixel value. Here, the first binned pixel value 812 (anti-red), second binned pixel value 814 (anti-green), third binned pixel value 816 (anti-green), and fourth binned pixel value 818 (anti-blue) may be combined to generate a second-level binned anti-color pixel value 822. In this particular example, the second-level binned anti-color pixel value 822 combines binned anti-color pixel values associated with different rejection bands—i.e., anti-red, anti-green, and anti-blue. Thus, the second-level binned anti-color pixel value 822 is also referred to as an anti-mixed color pixel value. The two levels of binning illustrated in FIG. 8 combines signals from both adjacent anti-color filters and differently colored anti-color filters. This binning arrangement provides relatively greater signal strength improvement as compared to, for example, the binning arrangement illustrated in FIG. 7. However, because pixel signals associated with differently colored anti-color filters are binned, the resulting binned anti-mixed color pixel value may lose color information (i.e., anti-color information).

Figure 9A:
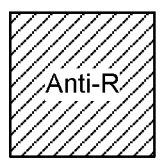
FIG. 9A shows an example of binning pixel signals associated with anti-color filters selected using a skip pattern, resulting in the selection of non-adjacent anti-color filters corresponding to different rejection bands.
Figure 9A:
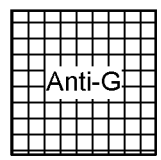
Figure 9A:
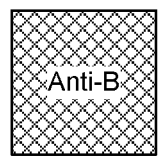
Figure 9A:
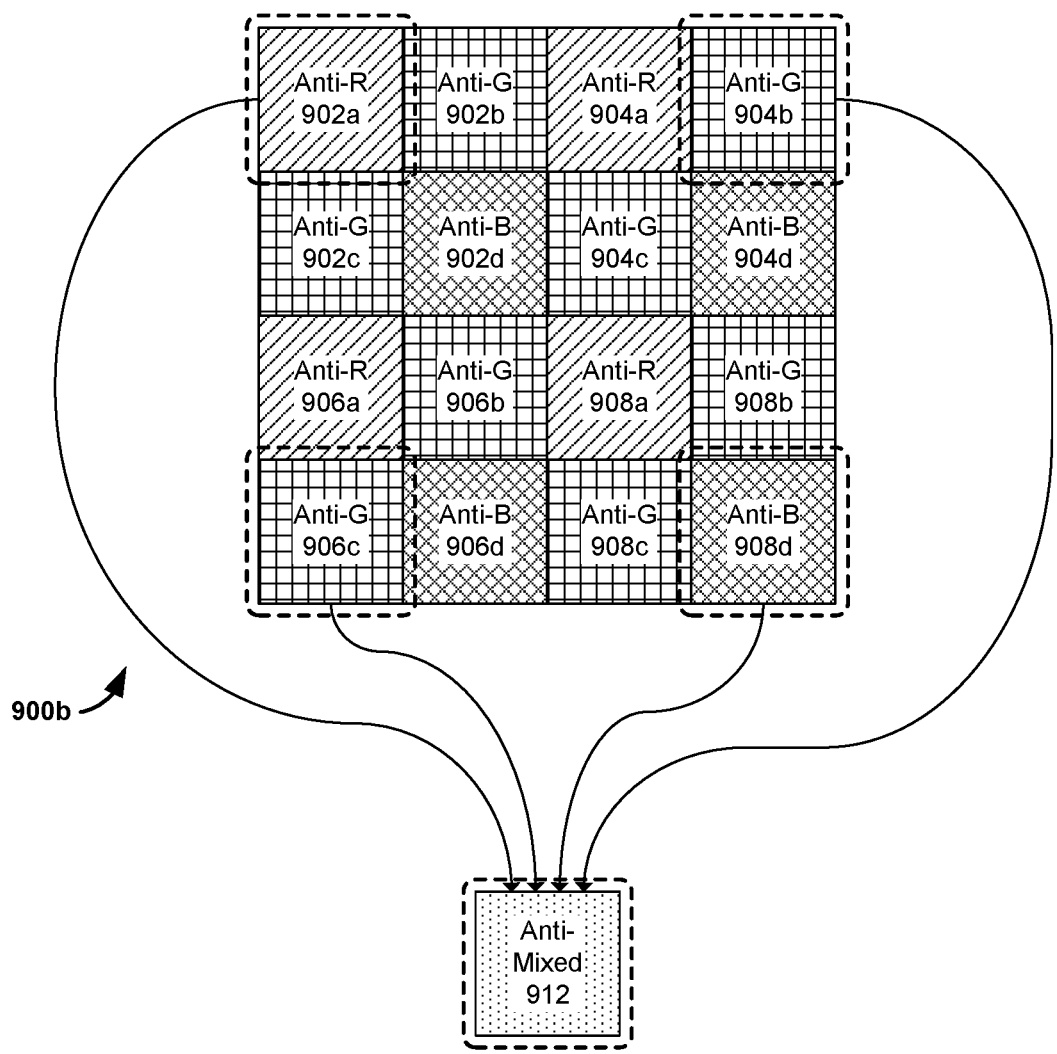

FIG. 9A shows an example of binning pixel signals associated with anti-color filters selected using a skip pattern, resulting in the selection of non-adjacent anti-color filters corresponding to different rejection bands. A portion 900b of an array of filters is illustrated. The portion 900b is similar to the portion 600b presented in FIG. 6. That is, FIG. 9A presents multiple instances of the same 2×2 anti-color filter pattern shown in FIG. 6. For example, an instance of the 2×2 anti-color filter pattern may comprise an anti-red filter 902a, an anti-green filter 902b, another anti-green filter 902c, and an anti-blue filter 902d. Binning is performed using anti-color filters selected from the array of filters using a skip pattern that is different from the 2×2 repeat pattern. Here, the skip pattern corresponds to a skip-by-three pattern.

For instance, a first anti-color filter selected for the binning process may be the anti-red filter 902a. The skip pattern skips three pixels to the right to land at an anti-green filter 904b, which is selected as the second anti-color filter for the binning process. The skip pattern skips three pixels down to land at an anti-green filter 906c, which is selected as the third anti-color filter for the binning process. Finally, the skip pattern skips three pixels to the right (from anti-green filter 906c) to land at an anti-blue filter 908d, which is selected as the fourth anti-color filter for the binning process. In this example, the skip pattern results in the selection of non-adjacent anti-color filters corresponding to different rejection bands, e.g., the anti-red filter 902a, the anti-green filter 904b, the anti-green filter 906c, and the anti-blue filter 908d, which are combined to generate the binned anti-mixed color output signal 912.

Figure 9B:
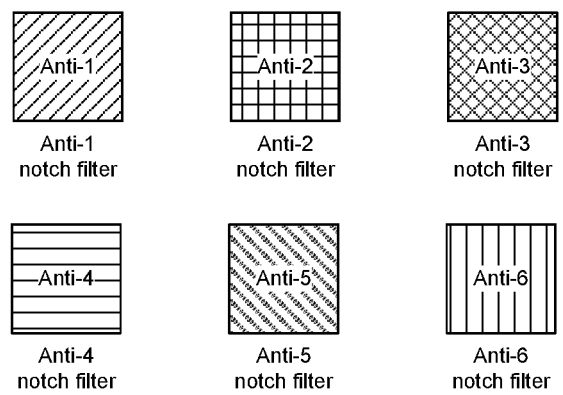
FIG. 9B shows another example of binning pixel signals associated with color filters selected using a skip pattern, with a variation of the anti-color repeat pattern.
Figure 9B:
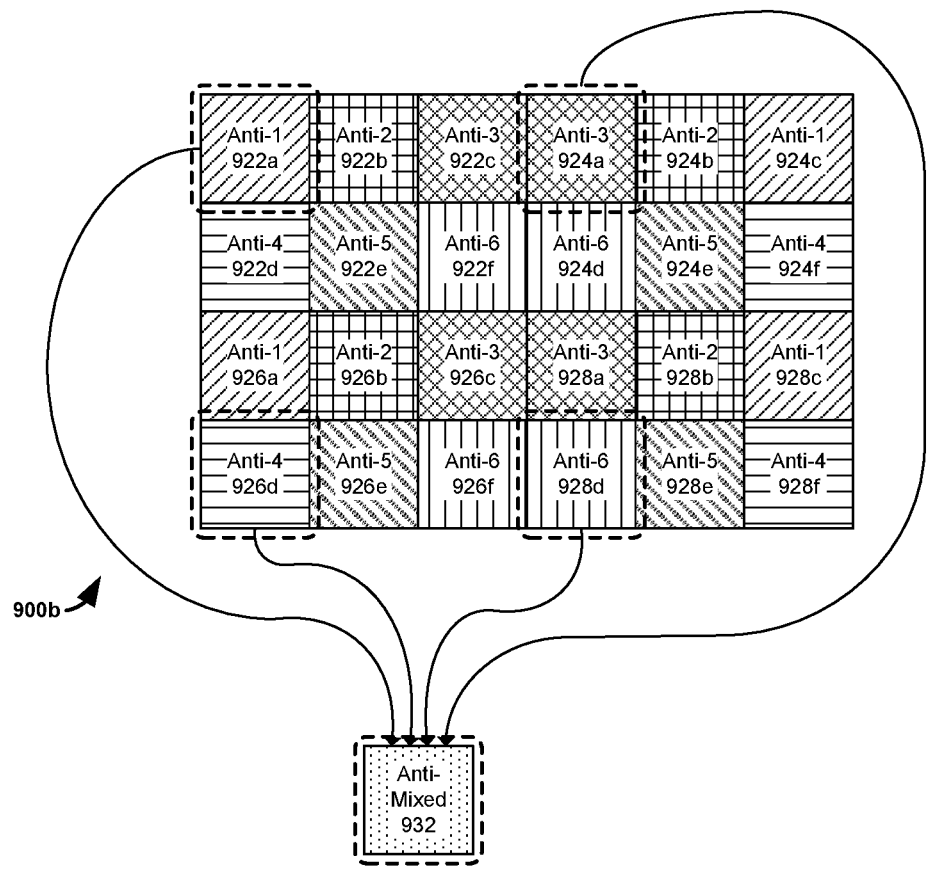

FIG. 9B shows another example of binning pixel signals associated with color filters selected using a skip pattern, with a variation of the anti-color repeat pattern. Here, the anti-color filter repeat pattern comprises both a basic anti-color pattern and a mirror version of the basic anti-color pattern. In this example, the basic anti-color pattern includes six anti-color filters, e.g., 922a, 922b, 922c, 922d, 922e, and 922f of different anti-colors, e.g., anti-color 1, anti-color 2, anti-color 3, anti-color 4, anti-color 5, and anti-color 6. The mirror version of the basic anti-color pattern includes six pixels, e.g., 924a, 924b, 924c, 924d, 924e, and 924f of the same anti-colors, but arranged in a left-right mirrored fashion. The overall anti-color repeat pattern comprises both (1) the basic anti-color pattern and (2) the mirror version of the basic anti-color pattern. The overall anti-color filter repeat pattern is a 2×6 pattern that comprises twelve anti-color filters, e.g., 922a, 922b, 922c, 922d, 922e, 922f, 924a, 924b, 924c, 924d, 924e, and 924f. The repeat pattern is repeated to form the rest of the sensor area. Another instance of the same overall repeat pattern may comprise, e.g., the twelve anti-color filters 922a, 922b, 922c, 922d, 922e, 922f, 924a, 924b, 924c, 924d, 924e, and 924f. Each of the six anti-colors, i.e., anti-color 1, anti-color 2, anti-color 3, anti-color 4, anti-color 5, and anti-color 6, may correspond to a different rejection band, such as shown for the six anti-color filters ACFR1 through ACFR6 described previously with respect to FIG. 4C. In FIG. 9B, the same skip-by-three skip pattern described previous with respect to FIG. 9A is once again used. Thus, pixel signals associated with anti-color filters 922a, 924a, 926d, and 928d may be binned to form an anti-mixed color output signal 932.

In each of the FIGS. 5-9B, only a portion of an array of filters is shown to simply illustration. In practice, the array of pixels may comprise additional portions of filters having similar structures. Each array of pixels may overlay a corresponding array of optical sensors and span an entire image area, e.g., as shown in FIG. 2. In some embodiments, transparent regions may be interspersed in the array of filters, as discussed herein. The array of optical sensors may generate pixel signals forming an image.

FIG. 10 is a circuit diagram showing a portion 1000 of an optical sensor unit configured to generate a binned pixel value by combining pixel signals using analog circuitry. The portion 1000 comprises four optical pixel sensors 1002a, 1002b, 1002c, and 1002d. The optical sensor 1002a comprises a photodiode 1004a, an amplifier 1006a, and a resistor 1008a. The particular configuration of the optical pixel sensor 1002a is shown for illustrative purposes only, and variations in circuit design may be implemented. An anti-color filter, e.g., anti-red filter 602a (previously shown in FIG. 6) is be positioned to filter light before it reaches the photodiode 1004a. As discussed, the anti-color filter may attenuate components of the light within a rejection band that characterizes the anti-color filter. In this case, the rejection band is associated with wavelengths corresponding to the color red. The photodiode 1004a receives the filtered light, and the optical pixel sensor 1002a (including the photodiode 1004a, amplifier 1006a, and resistor 1008a, etc.) generates an anti-red pixel signal 1010a.

The other optical sensors are similarly structured. The optical sensor 1002b comprises a photodiode 1004b, an amplifier 1006b, and a resistor 1008b. An anti-color filter, e.g., anti-green filter 602b (previously shown in FIG. 6) is be positioned to filter light before it reaches the photodiode 1004b. The photodiode 1004b receives the filtered light, and the optical pixel sensor 1002b generates an anti-green pixel signal 1010b. The optical sensor 1002c comprises a photodiode 1004c, an amplifier 1006c, and a resistor 1008c. An anti-color filter, e.g., anti-green filter 602c (previously shown in FIG. 6) is be positioned to filter light before it reaches the photodiode 1004c. The photodiode 1004c receives the filtered light, and the optical pixel sensor 1002c generates an anti-green pixel signal 1010c. The optical sensor 1002d comprises a photodiode 1004d, an amplifier 1006d, and a resistor 1008d. An anti-color filter, e.g., anti-blue filter 602d (previously shown in FIG. 6) is be positioned to filter light before it reaches the photodiode 1004d.

The photodiode 1004c receives the filtered light, and the optical pixel sensor 1002d generates an anti-green pixel signal 1010d. In this example, each of the anti-color pixel signals 1010a, 1010b, 1010c, and 1010d is shown as a voltage. Alternatively, each anti-color pixel signal may be provided as a current or some other quantifiable signal characteristic.

An analog summing circuit 1020 combines the four anti-color pixel signals 1010a, 1010b, 1010c, and 1010d. As shown, the analog summing circuit 1020 comprises an amplifier 1022, a feedback resistor 1024, and resistors 1026, 1028, 1030, and 1032. The particular configuration of the analog summing circuit 1020 is shown for illustrative purposes only, and variations in circuit design may be implemented. The output of the analog summing circuit 1020 is an analog binned anti-color pixel value 1036, which is the sum of the anti-color pixel signals 1010a, 1010b, 1010c, and 1010d, expressed in voltage form. Thus, FIG. 10 illustrates one example of combining a plurality of anti-color pixel signals using analog circuitry within an optical pixel sensor unit that includes the plurality of optical pixel sensors.

While only four optical sensors are shown in the portion 1000 for simplicity of illustration, it should be understood that the optical sensor unit may comprise additional optical sensors, additional summing circuits, and additional circuitry. For example, the optical sensor unit may comprise multiple instances of the portion 1000.

FIG. 11 is a circuit diagram showing a portion 1100 of an optical sensor unit configured to convert pixels signals from analog to digital signals, which may be combined using digital circuitry. The portion 1100 may comprise the same four optical pixel sensors 1002a, 1002b, 1002c, and 1002d as described previously in FIG. 10, with the same internal components. The four optical pixel sensors 1002a, 1002b, 1002c, and 1002d may generate the anti-color pixel signals 1010a, 1010b, 1010c, and 1010d, as discussed. Here, instead of summing the signals using analog circuitry, the signals are converted into digital form. A bank of analog-to-digital converters (ADCs) 1112, 1114, 1116, and 1118 convert the analog anti-color pixel signals 1010a, 1010b, 1010c, and 1010d into digital anti-color pixel signals 1110a, 1110b, 1110c, and 1110d, respectively. Each of the digital anti-color pixel signals may be represented as a digital value, e.g., an 8-bit value.

While only four optical sensors 1002a, 1002b, 1002c, and 1002d and corresponding ADCs 1112, 1114, 1116, and 1118 are shown in the portion 1010 for simplicity of illustration, it should be understood that the optical sensor unit may comprise additional optical sensors, additional ADCs, and additional circuitry. For example, the optical sensor unit may comprise multiple instances of the portion 1010.

As shown in FIG. 11, the anti-color pixel values may be combined digitally. In this example, the digital anti-color pixel signals 1110a, 1110b, 1110c, and 1110d are sent over a bus to an image signal processor (ISP) 1120, which may combine the digital anti-color pixel signals 1110a, 1110b, 1110c, and 1110d to generate a digital binned anti-color pixel value 1130, which may be consumed internally within the ISP 1120 or outputted as a data value and received by another application or process. Thus, FIG. 11 illustrates one example in which combining a plurality of pixel signals is performed using digital circuitry outside an optical pixel sensor unit that includes the plurality of optical pixel sensors. A processor, such as ISP 1120, is shown in FIG. 11 as an example. Other types of digital circuitry may be used to perform the combining operation, including digital logic circuits, e.g., a dedicated adder circuit, a simplified arithmetic logic unit (ALU), etc. The digital circuitry may be implemented on the same semiconductor substrate, or different semiconductor substrate, as the optical sensor unit.

In other embodiments, the combining of the plurality of pixel signals may be performed using a mix of analog circuitry and/or digital circuitry located inside and/or outside an optical pixel sensor that includes the plurality of optical pixel sensors. For example, referring to FIG. 5, pixel signals associated with the anti-red filter 502a and the anti-red filter 504a may be combined using analog circuitry such as that described in FIG. 10, to generate a first combined analog signal. Similarly, pixel signals associated with the anti-red filter 506a and the anti-red filter 508a may be combined using analog circuitry, again such as that described in FIG. 10, to generate a second combined analog signal. The first combined analog signal and the second combined analog signal may then be converted to digital form and summed using digital circuitry, such as that described in FIG. 11.

In another example, referring to FIG. 8, pixel signals associated with the anti-red filters 802a, 804a, 806a, and 808a may be combined using analog circuitry such as that described in FIG. 10, to generate the binned anti-red pixel value 812. Pixel signals from other groups of anti-color filters shown in FIG. 8 may be combined using analog circuitry in a similar way, to generate the binned anti-green pixel value 814, the binned anti-green pixel value 816, and the binned anti-blue pixel value 818. Appropriate ADC(s) and digital circuitry such as that described in FIG. 11 may be used to combine the binned anti-red pixel value 812, the binned anti-green pixel value 814, the binned anti-green pixel value 816, and the binned anti-blue pixel value 818, to generate the anti-mixed color value 822.

Figure 12:
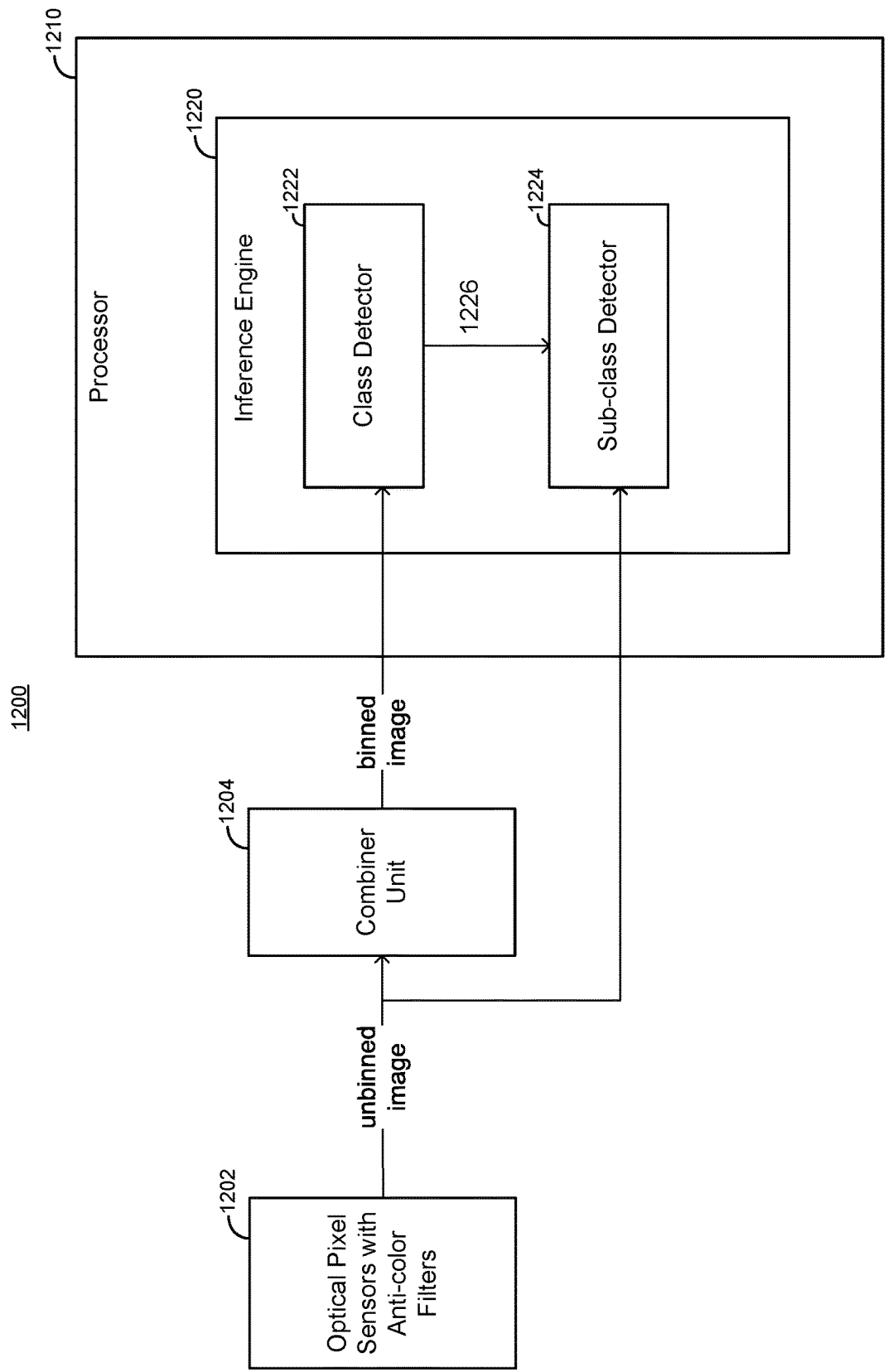
FIG. 12 is a block diagram illustrating a system 1200 for detecting a class of objects and a sub-class of objects based on binned anti-color pixel values and unbinned anti-color pixel values.

FIG. 12 is a block diagram illustrating a system 1200 for detecting a class of objects and a sub-class of objects based on binned anti-color pixel values and unbinned anti-color pixel values. As shown, the system 1200 comprises an optical sensor unit 1202, a combiner unit 1204, and a processor 1210. As discussed previously, specific design of various components may vary depending on implementation. In this example, the combiner unit is shown as being a separate unit apart from the optical sensor unit 1202 and the processor 1210. In other implementations, the combiner 1204, which may be used to combine pixel signals to generate binned pixel signals, may be implemented within the optical pixel sensor unit 1202 and/or the processor 1210.

As shown here, the optical pixel sensor unit 1202 generates an unbinned image. The unbinned image may comprise pixel signals generated at optical pixel sensors based on light filtered using anti-color filters, as discussed previously. The pixel signals may comprise specific anti-color pixel signals corresponding to different anti-colors, such as anti-red, anti-green, and anti-blue pixel signals. For example, the pixel signals may comprise the digital anti-color pixel signals 1110a (anti-red), 1110b (anti-green), 1110c (anti-green), and 1110d (anti-blue). As such, the unbinned image retains anti-color information.

The combiner unit 1202 may combine various anti-color signals and thereby convert the unbinned image into binned image. For example, the combiner unit 1202 may combine the digital anti-color pixel signals 1110a, 1110b, 1110c, and 1110d to generate a binned pixel value. A collection of such binned pixel values may form the binned image. Each "pixel" (i.e., binned pixel value) of the binned image is associated with increased signal strength resulting from the binning process. However, the resolution of the binned image may be reduced, e.g., by a factor of four, as compared to the unbinned image. The binned image may also have lost anti-color information and only retain brightness information, because the combiner unit 1204 may combine differently colored anti-color pixel values, e.g., the digital anti-color pixel signals 1110*a* (anti-red), 1110*b* (anti-green), 1110*c* (anti-green), and 1110*d* (anti-blue) to form one corresponding binned pixel value.

The processor 1210 may include an inference engine 1220 configured to perform inference tasks based on the binned image and/or the unbinned image generated by the combiner unit 1204 and/or the optical sensor unit 1202. For example, the inference engine 1220 may perform object detection using the binned image and/or the unbinned image, e.g., by utilizing a trained optical machine learning (ML) model.

In one embodiment, the inference engine comprises a class detector 1222 and a sub-class detector 1224. The class detector 1222 may be configured to detect a class of objects using the binned image. For example, the class detector 1222 may comprise an ML model trained to detect a class of objects labeled as "apple." As discussed, the binned image may have lost anti-color information as a result of the binning process, which may combine anti-color pixel signals corresponding to different anti-colors—i.e., anti-color pixel signals generated from light filtered with anti-color filters corresponding to different rejection bands. As such, the binned image may lack color information (in this case, anti-color information). The binned image may also be associated with reduced resolution, as discussed. However, the binned image may be associated with boosted signal strength. Thus, the ML-based class detector 1222 may detect an apple within the binned image, based on pixel brightness (e.g., monochromatic information that convey the shape, shading, and other appearance characteristics of the object), even in the absence of anti-color information. Indeed, the increased signal strength gained as result of the binning process may allow the class detector 1222 to achieve superior performance, especially in low-light and/or short exposure time scenarios.

According to the present embodiment, the sub-class detector 1224 may be configured to detect a sub-class of objects within the class of objects. For instance, the sub-class detector 1224 may comprise a color detector configured to detect a sub-class of objects labeled as "green apple." In one embodiment, once the class detector 1222 has detected the object as being an apple and determined a pixel region associated with the detected object (i.e., "apple") within the image, the sub-class detector 1224 may be configured to determine the color associated with the pixel region. The class detector 1222 may send data 1226 identifying the location of the pixel region associated with the detected object in the image to the sub-class detector. To obtain color information, the sub-class detector 1224 may obtain statistics based on anti-color pixel values of the unbinned image. The sub-class detector 1224 may thus detect the sub-class of objects based on anti-color information.

For example, from the unbinned image, the sub-class detector 1224 may sample a small anti-color pixel values obtained from one or more locations within the pixel region associated with the detected object. For instance, the sub-class detector may sample digital anti-color pixel signals 1110*a* (anti-red), 1110*b* (anti-green), 1110*c* (anti-green), and 1110*d* (anti-blue) from a center location within the pixel region associated with the "apple" object as detected by the class detector 1222. The sub-class detector 1224 may even do so with fewer than a full set of anti-color pixel signals. In one example, a detection scenario might presume that a detected apple can only be either a red apple or a green apple. In such a case, the sub-class detector 1224 may conclude, based the value of the digital anti-color pixel signal 1110*a* (anti-red) surpassing a threshold, that the apple is not a red apple and therefore must be a green apple.

In another example, the digital anti-color pixel signals 1110*a* (anti-red) and 1110*d* (anti-blue) may both surpass a threshold. In such a case, the sub-class detector 1224 may conclude that the detected apple is associated with very low red and blue color components, and therefore it may be a green apple. In practice, anti-color values may not perfectly fit within discrete anti-color bands and may include components in various bands. Nevertheless, the sub-class detector 1224 may utilize similar protocols as discussed above as well as other protocols for detecting the sub-class of objects, e.g., detecting an object of a particular color. The sub-class detector 1224 may also obtain statistics based on anti-color pixel values of the unbinned image in other ways. For example, instead of sampling anti-color pixel values from locations within the pixel region associated with the detected object, the sub-class detector 1224 may compute a mean, a median, or another type of representative statistical value using the anti-color pixel values from a pixel region associated with the detected object, in order to detect the sub-class of objects.

The unbinned image generated by the optical sensors unit 1202 and/or binned image generated by the combiner unit 1204 may also be used to generate an output image that is produced by the system 1200. The output image may simply be the unbinned image or binned image. Alternatively or additionally, the output image may be a "demosaiced" (or "debayered") version of the unbinned image and/or binned image. Here, the unbinned and/or binned image is derived from optical sensors receiving anti-color filtered light. Thus, the values are anti-color pixel values, as opposed to traditional color pixel values. As such, the demosacing process may generate a reconstructed full anti-color image from the incomplete anti-color pixel samples produced from the optical sensors. Just as an example, the 4×4 unbinned anti-color pixel portion 600*b* shown in FIG. 6 comprises only 16 anti-color pixel values—i.e., 4 anti-red pixel values, 4 anti-green pixel values, another 4 anti-green pixel values, and 4 anti-blue pixel values. After "demosaicing," this image becomes a full 4×4 anti-RGB image comprising 64 anti-color pixel values—i.e., 16 anti-red pixel values, 16 anti-green pixel values, another 16 anti-green pixel values, and 16 anti-blue pixel values. In other words, for each of the 4 anti-color channels (anti-R, anti-G, anti-G, and anti-B), there is a 4×4 array of anti-color pixel values, which together form the "demosaiced" anti-color image. The anti-color pixel values for the two anti-G channels may also be combined to form one anti-G channel, which results a 4×4 array of anti-color pixel values for each of the resulting 3 anti-color channel, i.e., the anti-R channel, the anti-G channel, and the anti-B channel.

Figure 13:
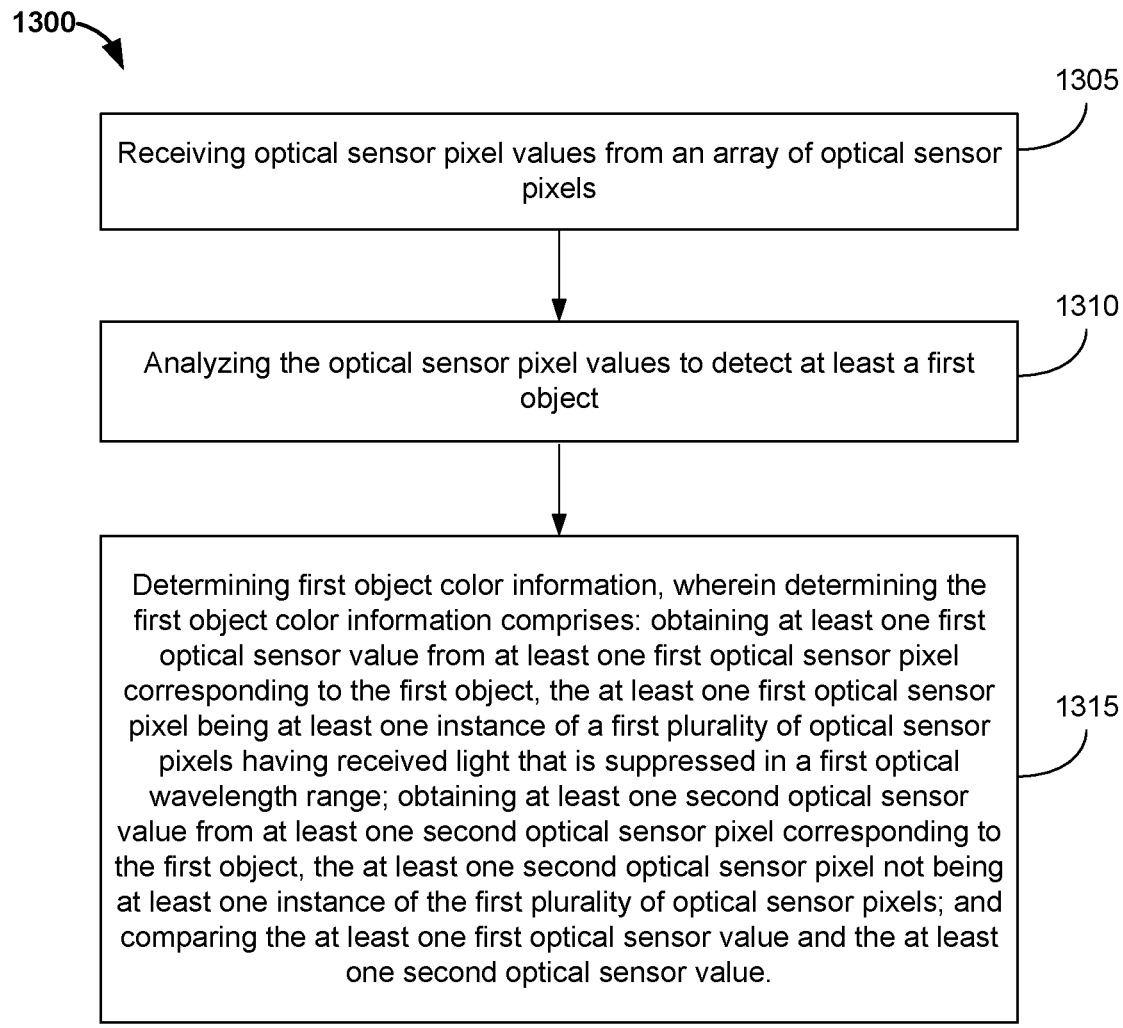
FIG. 13 is a flow diagram that provides an example of color determination operations based on received light that is suppressed in a first optical wavelength range, according to some disclosed methods.

FIG. 13 is a flow diagram that provides examples of operations according to some disclosed methods. The blocks of FIG. 13 (and those of other flow diagrams provided herein) may, for example, be performed by the apparatus 100 of FIG. 1A, by a similar apparatus or by a system that includes one or more such devices. As with other methods disclosed herein, the method outlined in FIG. 13 may include more or fewer blocks than indicated. Moreover, the blocks of methods disclosed herein are not necessarily performed in the order indicated.

In this example, block 1305 involves receiving optical sensor pixel values from an array of optical sensor pixels. According to some implementations, block 1305 may involve a control system of an apparatus receiving the optical sensor pixel values from an array of optical sensor pixels that resides in the same apparatus. However, in other implementations, block 1305 may involve a control system of an apparatus receiving the optical sensor pixel values from an array of optical sensor pixels that resides in a different apparatus.

According to this example, block 1310 involves analyzing the optical sensor pixel values to detect at least a first object. In some examples, block 1310 may involve a background subtraction process. It is often the case that an image's region(s) of interest (ROI) are objects (such as humans, animals, cars, etc.) in the image's foreground. As noted above, background subtraction is one method for distinguishing the background from the ROI. Background subtraction may be based, at least in part, on detected image changes between a current frame and a reference frame, which may be called a "background model." Image change detection may be used for detecting moving objects in a video stream, such as a video stream from a security camera, a video stream from a doorbell camera, a video stream from a baby monitor camera, a video stream from a camera associated with a voice-controlled device, etc. (As used herein, the term "camera" may be used to refer to any one of a range of devices having varying capabilities and complexities, including security cameras, simple optical sensors, etc.) For example, a current pixel, or a current group of pixels, may be considered to be part of the foreground if the difference between the current pixel (or the current group of pixels) and a corresponding portion of the background model is greater than or equal to a threshold value.

According to some examples, block 1310 may involve applying one or more pattern recognition methods. Some pattern recognition methods may involve applying a feature selection process prior to applying a pattern-matching algorithm. Some such pattern recognition methods may, in some instances, involve applying a classifier, such as a probabilistic classifier. In some examples, block 1310 and/or block 1315 may involve "binning" or otherwise aggregating optical sensor pixel values. Some examples are described below.

In some instances, it may be beneficial both to determine a first object type (e.g., to determine that a detected first object is an automobile) and to determine object color information (e.g., whether the automobile is green or blue, more green than blue, more blue than red, etc.). Accordingly, in this example block 1315 involves determining first object color information. Here, block 1315 involves obtaining at least one first optical sensor value from at least one first optical sensor pixel corresponding to the first object. In this example, the at least one first optical sensor pixel is at least one instance of a first plurality of optical sensor pixels having received light that is suppressed in a first optical wavelength range. The at least one first optical sensor pixel may, for example, be proximate at least one corresponding first anti-color filter that is configured to at least partially suppress transmission of light in the first optical wavelength range. The at least one corresponding first anti-color filter may correspond to at least one first region of an anti-color filter array.

According to this implementation, block 1315 involves obtaining at least one second optical sensor value from at least one second optical sensor pixel corresponding to the first object. In this example, the at least one second optical sensor pixel is not at least one instance of the first plurality of optical sensor pixels. Accordingly, the at least one second optical sensor pixel is at least one instance of a second plurality of optical sensor pixels having received light that is not suppressed in the first optical wavelength range. The at least one second optical sensor pixel may, for example, be proximate at least one corresponding second anti-color filter that is configured to at least partially suppress transmission of light in a second optical wavelength range. However, in some instances the at least one second optical sensor pixel may be proximate at least one substantially transparent region of the anti-color filter array.

According to this example, block 1315 involves comparing the at least one first optical sensor value and the at least one second optical sensor value. For example, suppose that a first optical sensor pixel and a second optical sensor pixel both received light from the same object. Suppose further that the first optical sensor pixel received light filtered by a first anti-color filter that suppressed the transmission of light in a wavelength range corresponding to a first color. Let us also suppose that the second optical sensor pixel received light from a second region of an anti-color array that does not suppress the transmission of light in a wavelength range corresponding to the first color.

According to one such example, the second region of the anti-color array may be transparent, or substantially transparent, in the wavelength range that is visible to human beings (roughly 380 nm to 740 nm). As used herein, "substantially transparent" may refer to light transmission of nearly 100% in a particular wavelength range, such as the visible spectrum. "Nearly 100%" may refer to an average percentage of light transmission and/or to a minimum percentage of light transmission, e.g., an average of at least 99% transmission within a particular wavelength range, an average of at least 98% transmission within the wavelength range, an average of at least 97% transmission within the wavelength range, an average of at least 96% transmission within the wavelength range, an average of at least 95% transmission within the wavelength range, an average of at least 94% transmission within the wavelength range, etc.

According to this example, if a first optical sensor value corresponding to the first optical sensor pixel is lower than a second optical sensor value corresponding to the second optical sensor pixel, it is likely that the object's color is the first color. This is true because both optical sensor values correspond to light received from the same object. Assuming that both optical sensor pixels are functioning properly, the reason that first optical sensor value is lower should be that less light was received from the object in the first wavelength range.

For example, suppose that the first optical sensor pixel and the second optical sensor pixel both received light from an apple. Suppose further that the first optical sensor pixel received light filtered by a first anti-color filter that suppressed the transmission of light in a wavelength range corresponding to the color red (625-740 nm). Such an anti-color filter may be referred to herein as an "anti-red filter." According to this example, if the first optical sensor value is lower than the second optical sensor value, it is likely that the object's color is red.

The degree to which an anti-color filter will affect a corresponding optical sensor pixel value may depend on various factors, including but not limited to the wavelength range within which light transmission is suppressed by the anti-color filter and the degree to which light transmission is suppressed by the anti-color filter within that wavelength range. Some examples are described below with reference to FIGS. 3A-3C.

Therefore, the variation in optical sensor pixel values that will be evaluated in block 1315 may also depend, either directly or indirectly, on these factors. In one simple example, suppose that the first anti-color filter were an "anti-red filter" configured to suppress the total amount of light received from a red object (and detected by a corresponding optical sensor pixel) by approximately 10%. Suppose also that the second optical sensor pixel received light from a transparent region of an anti-color array. In one such example, block 1315 may involve determining whether the second optical sensor value exceeds the first optical sensor value by approximately 10%, or by at least a threshold value that is less than 10% (e.g., a threshold value of 5%, of 6%, of 7%, of 8%, of 9%, etc.). According to one such example, if the first optical sensor value is at least 5% lower than the second optical sensor value, it may be determined in block 1315 that the object's color is red.

In some such examples, multiple instances of first optical sensor values and multiple instances of second optical sensor values may be summed or averaged before the comparison of block 1315. Using multiple instances of first and second optical sensor values can reduce potential error caused by optical sensor pixel variability.

In another such example, the second region of the anti-color array may suppress the transmission of light in a different wavelength range, e.g., a wavelength range corresponding to a second color. Such examples may be relatively more useful when an object is likely to be either the first color or the second color, but not both. According to one such example, if a first optical sensor value corresponding to the first optical sensor pixel is lower than a second optical sensor value corresponding to the second optical sensor pixel, it is likely that the object's color is the first color. However, if the first optical sensor value is higher than the second optical sensor value, it is likely that the object's color is the second color. In some such examples, multiple instances of first optical sensor values and multiple instances of second optical sensor values may be summed or averaged before the comparison of block 1315.

As noted elsewhere herein, in some implementations the anti-color filter array 107 may include a third plurality of third anti-color filter regions. In some such implementations, the third plurality of third anti-color filter regions may include a third plurality of third anti-color filters. Each of the third anti-color filters may be proximate a corresponding instance (or group of instances) of a third plurality of optical sensor pixels. In some such implementations, the third plurality of third anti-color filter regions may include one or more transparent or substantially transparent regions. Alternatively, or additionally, in some implementations each of the third anti-color regions may include filters configured to at least partially suppress transmission of light in a third optical wavelength range.

In some such implementations, method 1300 may involve obtaining at least one third optical sensor value from at least one third optical sensor pixel corresponding to the first object. According to some such examples, the comparison of block 1315 may involve comparing the at least one third optical sensor value with the at least one first optical sensor value and the at least one second optical sensor value.

For example, suppose that a first optical sensor pixel, a second optical sensor pixel and a third optical sensor pixel all received light from the same object. Suppose further that the first optical sensor pixel received light filtered by a first anti-color filter that suppressed the transmission of light in a wavelength range corresponding to a first color. Let us also suppose that the second optical sensor pixel received light from a second region of an anti-color array that suppressed the transmission of light in a wavelength range corresponding to a second color and that the third optical sensor pixel received light from a third region of an anti-color array that is transparent or substantially transparent. If the third optical sensor value and the first optical sensor value are both greater than the second optical sensor value, it is likely that the object is the second color. If the third optical sensor value and the second optical sensor value are both greater than the first optical sensor value, it is likely that the object is the first color. If the third optical sensor value is greater than both the first optical sensor value and the second optical sensor value, it is likely that the object includes both the first color and the second color.

In another example, suppose that that the first optical sensor pixel received light filtered by a first anti-color filter that suppressed the transmission of light in a wavelength range corresponding to a first color, the second optical sensor pixel received light from a second region of an anti-color array that suppressed the transmission of light in a wavelength range corresponding to a second color and that the third optical sensor pixel received light from a third region of an anti-color array that suppressed the transmission of light in a wavelength range corresponding to a third color. If the third optical sensor value and the first optical sensor value are both greater than the second optical sensor value, it is likely that the object is the second color. If the third optical sensor value and the second optical sensor value are both greater than the first optical sensor value, it is likely that the object is the first color. If the third optical sensor value is less than both the first optical sensor value and the second optical sensor value, it is likely that the object is the third color.

As noted elsewhere herein, some implementations of the anti-color filter array 107 may include more than three anti-color filter regions. Some such implementations may include one or more substantially transparent regions and/or an $N^{th}$ plurality of $N^{th}$ anti-color filters, where N is an integer greater than or equal to four. Each of the $N^{th}$ anti-color filters may be configured to at least partially suppress transmission of light in an $N^{th}$ optical wavelength range.

In some such implementations, method 1300 may involve obtaining at least first through $N^{th}$ optical sensor values from at least first through $N^{th}$ optical sensor pixels corresponding to the first object. In some such examples, the first through $N^{th}$ optical sensor pixels may correspond to first through $N^{th}$ regions of the anti-color filter array 107. According to some such examples, the comparison of block 1315 may involve comparing each of the first through $N^{th}$ optical sensor values with one another.

As noted elsewhere herein, the degree to which an anti-color filter will affect a corresponding optical sensor pixel value may depend on various factors. These factors may include, but are not limited to, the wavelength range within which light transmission is suppressed by the anti-color filter and the degree to which light transmission is suppressed by the anti-color filter within that wavelength range.

Figure 14:
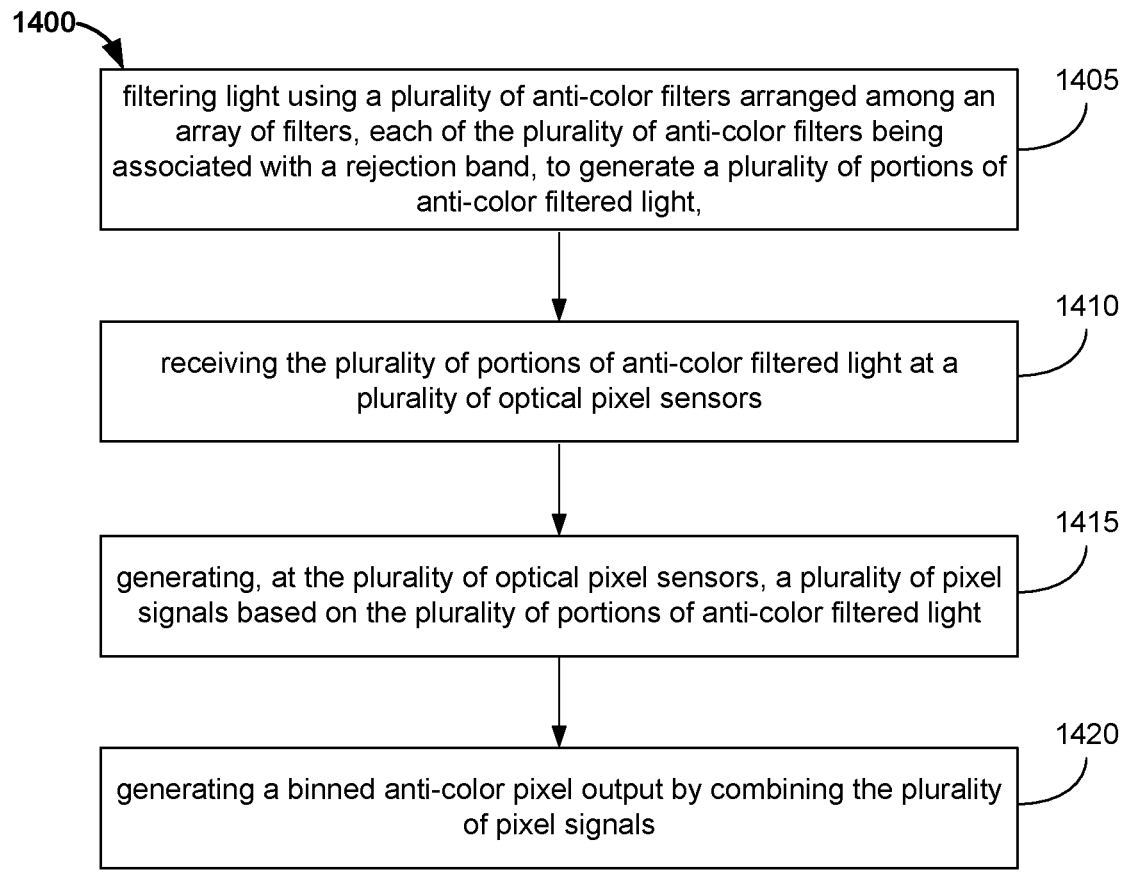
FIG. 14 is a flow diagram that provides an example of binning of pixel signals associated with anti-color filters, according to some disclosed methods.

FIG. 14 is a flow diagram that provides examples of operations according to some disclosed methods. The blocks of FIG. 14 may, for example, be performed by the apparatus 100 of FIG. 1A, the portion 1000 of the optical sensor unit of FIG. 10, the portion 1100 of the optical sensor unit of FIG. 11, by a similar apparatus or by a system that includes one or more such devices. As with other methods disclosed herein, the method outlined in FIG. 14 may include more or fewer blocks than indicated. Moreover, the blocks of methods disclosed herein are not necessarily performed in the order indicated.

Here, block 1405 involves filtering light using a plurality of anti-color filters arranged among an array of filters, each of the plurality of anti-color filters corresponding to a rejection band, to generate a plurality of portions of anti-color filtered light. For example, block 1405 may be performed by the anti-color filters 602a, 602b, 602c, and 602d shown in FIGS. 10 and 11. Block 1410 involves receiving the plurality of portions of anti-color filtered light at a plurality of optical pixel sensors. For example, block 1410 may be performed by the optical sensors 1002a, 1002b, 1002c, and 1002d shown in FIGS. 10 and 11. Block 1415 involves generating, at the plurality of optical pixel sensors, a plurality of pixel signals based on the plurality of portions of anti-color filtered light received at the plurality of optical sensors. For example, block 1415 may be performed by the optical sensors 1002a, 1002b, 1002c, and 1002d shown in FIGS. 10 and 11. Block 1420 involves generating a binned anti-color pixel value by combining the plurality of pixel signals. For example, block 1420 may be performed by the analog summing circuit 1020 shown in FIG. 10 and/or the ADC 1112, 1114, 1116, and 1118 in conjunction with the image signal processor (ISP) 1120 shown in FIG. 11.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method for generating pixel values, comprising:
    filtering light using a plurality of anti-color filters arranged among an array of filters, each of the plurality of anti-color filters corresponding to a rejection band, a first passband, and a second passband, the rejection band being flanked by the first passband and the second passband, to generate a plurality of portions of anti-color filtered light;
    receiving the plurality of portions of anti-color filtered light at a plurality of optical pixel sensors;
    generating, at the plurality of optical pixel sensors, a plurality of pixel signals based on the plurality of portions of anti-color filtered light; and
    generating a binned anti-color pixel value by combining the plurality of pixel signals, wherein the generating the binned anti-color pixel value comprises:
        at a first level of binning, (1) generating a first binned anti-color pixel value by combining a first plurality of pixel signals based on a first plurality of portions of anti-color filtered light and (2) generating a second binned anti-color pixel value by combining a second plurality of pixel signals based on a second plurality of portions of anti-color filtered light; and
        at a second level of binning, generating a second-level binned anti-color pixel value by combining the first binned anti-color pixel value and the second binned anti-color pixel value.

2. The method of claim 1, wherein the plurality of anti-color filters comprises non-adjacent anti-color filters in the array of filters.

3. The method of claim 1, wherein the plurality of anti-color filters comprises anti-color filters corresponding to different rejection bands.

4. The method of claim 3, wherein the anti-color filters corresponding to different rejection bands are adjacent anti-color filters in the array of filters.

5. The method of claim 3, wherein the anti-color filters corresponding to different rejection bands are non-adjacent anti-color filters in the array of filters.

6. The method of claim 1, wherein:
    the first plurality of portions of anti-color filtered light are generated using first adjacent anti-color filters corresponding to a first rejection band, and
    the second plurality of portions of anti-color filtered light are generated using second adjacent anti-color filters corresponding to a second rejection band different from the first rejection band.

7. The method of claim 1, wherein:
    the plurality of anti-color filters comprises anti-color filters corresponding to different rejection bands, and
    the binned anti-color pixel value is used for detecting a class of objects.

8. The method of claim 7, wherein one or more of the plurality of pixel signals based on the plurality of portions of anti-color filtered light are used for detecting a sub-class of objects within the class of objects.

9. The method of claim 8, wherein:
    detecting the class of objects is based on pixel brightness, and
    detecting the sub-class of objects is based on anti-color pixel information.

10. The method of claim 1, wherein:
    the array of filters comprises a repeat pattern of anti-color filters,
    the plurality of anti-color filters is selected from the array of filters using a skip pattern different from the repeat pattern.

11. The method of claim 10, wherein:
    the repeat pattern comprises a two-by-two repeat pattern, and
    the skip pattern corresponds to skip-by-three skip pattern.

12. The method of claim 1, wherein combining the plurality of pixel signals is performed using analog circuitry within an optical pixel sensor unit, the optical pixel sensor unit including the plurality of optical pixel sensors.

13. The method of claim 1, wherein combining the plurality of pixel signals is performed using digital circuitry outside an optical pixel sensor unit, the optical pixel sensor unit including the plurality of optical pixel sensors.

14. The method of claim 13, wherein the digital circuitry comprises a processor.

15. An apparatus for generating pixel values comprising:
    a plurality of anti-color filters arranged among an array of filters, each of the plurality of anti-color filters corresponding to a rejection band, a first passband, and a second passband, the rejection band being flanked by the first passband and the second passband, the plurality of anti-color filters configured to filter light and generate a plurality of portions of anti-color filtered light;
    a plurality of optical pixel sensors configured to receive the plurality of portions of anti-color filtered light and generate a plurality of pixel signals based on the plurality of portions of anti-color filtered light;
    circuitry configured to generate a binned anti-color pixel value by combining the plurality of pixel signals, wherein the circuitry configured to generate the binned anti-color pixel value is configured to:
        at a first level of binning, (1) generate a first binned anti-color pixel value by combining a first plurality of pixel signals based on a first plurality of portions of anti-color filtered light and (2) generate a second binned anti-color pixel value by combining a second plurality of pixel signals based on a second plurality of portions of anti-color filtered light; and at a second level of binning, generate a second-level binned anti-color pixel value by combining the first binned anti-color pixel value and the second binned anti-color pixel value.

16. The apparatus of claim 15, wherein the plurality of anti-color filters comprises non-adjacent anti-color filters in the array of filters.

17. The apparatus of claim 15, wherein the plurality of anti-color filters comprises anti-color filters corresponding to different rejection bands.

18. The apparatus of claim 17, wherein the anti-color filters corresponding to different rejection bands are adjacent anti-color filters in the array of filters.

19. The apparatus of claim 17, wherein the anti-color filters corresponding to different rejection bands are non-adjacent anti-color filters in the array of filters.

20. The apparatus of claim 15, wherein:
the plurality of anti-color filters comprises first adjacent anti-color filters corresponding to a first rejection band and configured to generate the first plurality of portions of anti-color filtered light, and
the plurality of anti-color filters comprises second adjacent anti-color filters corresponding to a second rejection band, different from the first rejection band, and configured to generate the second plurality of portions of anti-color filtered light.

21. The apparatus of claim 15, wherein:
the plurality of anti-color filters comprises anti-color filters corresponding to different rejection bands, and
the apparatus further comprises a class detector configured to detect a class of objects using the binned anti-color pixel value.

22. The apparatus of claim 21,
wherein the apparatus further comprises a sub-class detector configured to detect a sub-class of objects within the class of objects using one or more of the plurality of pixel signals based on the plurality of portions of anti-color filtered light.

23. The apparatus of claim 22, wherein:
the class detector is configured to detect the class of objects is based on pixel brightness, and
the sub-class detector is configured to detect the sub-class of objects is based on anti-color pixel information.

24. The apparatus of claim 15, wherein:
the array of filters comprises a repeat pattern of anti-color filters,
the plurality of anti-color filters is selected from the array of filters using a skip pattern different from the repeat pattern.

25. The apparatus of claim 24, wherein:
the repeat pattern comprises a two-by-two repeat pattern, and
the skip pattern corresponds to skip-by-three skip pattern.

26. The apparatus of claim 15, wherein the circuitry configured to generate the binned anti-color pixel value comprises analog circuitry within an optical pixel sensor unit, the optical pixel sensor unit including the plurality of optical pixel sensors.

27. The apparatus of claim 15, wherein the circuitry configured to generate the binned anti-color pixel value comprises digital circuitry outside an optical pixel sensor unit, the optical pixel sensor unit including the plurality of optical pixel sensors.

28. The apparatus of claim 27, wherein the digital circuitry comprises a processor.

29. A system for generating pixel values comprising:
means for filtering light using a plurality of anti-color filters arranged among an array of filters, each of the plurality of anti-color filters corresponding to a rejection band, a first passband, and a second passband, the rejection band being flanked by the first passband and the second passband, to generate a plurality of portions of anti-color filtered light,
means for receiving the plurality of portions of anti-color filtered light at a plurality of optical pixel sensors;
means for generating, at the plurality of optical pixel sensors, a plurality of pixel signals based on the plurality of portions of anti-color filtered light; and
means for generating a binned anti-color pixel value by combining the plurality of pixel signals, wherein the means for generating the binned anti-color pixel value comprises:
means for, at a first level of binning, (1) generating a first binned anti-color pixel value by combining a first plurality of pixel signals based on a first plurality of portions of anti-color filtered light and (2) generating a second binned anti-color pixel value by combining a second plurality of pixel signals based on a second plurality of portions of anti-color filtered light; and
means for, at a second level of binning, generating a second-level binned anti-color pixel value by combining the first binned anti-color pixel value and the second binned anti-color pixel value.

30. A non-transitory computer-readable medium having instructions stored thereon for generating pixel values, including instructions for causing one or more processors to:
control generating, at a plurality of optical pixel sensors, a plurality of pixel signals based on a plurality of portions of anti-color filtered light filtered using a plurality of anti-color filters arranged among an array of filters, each of the plurality of anti-color filters corresponding to a rejection band, a first passband, and a second passband, the rejection band being flanked by the first passband and the second passband; and
control generating, at a combining unit, a binned anti-color pixel value by combining on the plurality of pixel signals, wherein the instructions for causing the one or more processors to control generating the binned anti-color pixel value comprises instructions for causing the one or more processors to:
control, at a first level of binning, (1) generating a first binned anti-color pixel value by combining a first plurality of pixel signals based on a first plurality of portions of anti-color filtered light and (2) generating a second binned anti-color pixel value by combining a second plurality of pixel signals based on a second plurality of portions of anti-color filtered light; and
control, at a second level of binning, generating a second-level binned anti-color pixel value by combining the first binned anti-color pixel value and the second binned anti-color pixel value.

31. A device for generating pixel values comprising:
a memory; and
a processor communicatively coupled to the memory, the processor configured to:
control generating, at a plurality of optical pixel sensors, a plurality of pixel signals based on a plurality of portions of anti-color filtered light filtered using a plurality of anti-color filters arranged among an array of filters, each of the plurality of anti-color filters corresponding to a rejection band, a first passband, and a second passband, the rejection band being flanked by the first passband and the second passband; and control generating, at a combining unit, a binned anti-color pixel value by combining on the plurality of pixel signals, wherein to control the generating the binned anti-color pixel value, the processor is configured to:

control, at a first level of binning, (1) generating a first binned anti-color pixel value by combining a first plurality of pixel signals based on a first plurality of portions of anti-color filtered light and (2) generating a second binned anti-color pixel value by combining a second plurality of pixel signals based on a second plurality of portions of anti-color filtered light; and control, at a second level of binning, generating a second-level binned anti-color pixel value by combining the first binned anti-color pixel value and the second binned anti-color pixel value.

\* \* \* \* \*